United States Patent
Usuba

(10) Patent No.: US 10,860,722 B2
(45) Date of Patent: Dec. 8, 2020

(54) SECURITY RISK MANAGEMENT SYSTEM, SERVER, CONTROL METHOD, AND NON-TRANSITORY COMPUTER-READABLE MEDIUM

(71) Applicant: NEC CORPORATION, Tokyo (JP)

(72) Inventor: Toshimitsu Usuba, Tokyo (JP)

(73) Assignee: NEC CORPORATION, Tokyo (JP)

(*) Notice: Subject to any disclaimer, the term of this patent is extended or adjusted under 35 U.S.C. 154(b) by 280 days.

(21) Appl. No.: 16/084,687

(22) PCT Filed: Mar. 23, 2017

(86) PCT No.: PCT/JP2017/011586
§ 371 (c)(1),
(2) Date: Sep. 13, 2018

(87) PCT Pub. No.: WO2017/164269
PCT Pub. Date: Sep. 28, 2017

(65) Prior Publication Data
US 2019/0080095 A1  Mar. 14, 2019

(30) Foreign Application Priority Data
Mar. 25, 2016  (JP) .................... 2016-061774

(51) Int. Cl.
*G06F 11/00* (2006.01)
*G06F 21/57* (2013.01)
(Continued)

(52) U.S. Cl.
CPC .......... *G06F 21/577* (2013.01); *G06F 21/552* (2013.01); *G06Q 10/0635* (2013.01); *G06F 2221/034* (2013.01)

(58) Field of Classification Search
CPC ................. G06F 21/552; G06F 21/577; G06F 2221/034; G06Q 10/0635
See application file for complete search history.

(56) References Cited

U.S. PATENT DOCUMENTS

2003/0055994 A1* 3/2003 Herrmann .......... H04L 12/2876
709/229
2010/0257610 A1* 10/2010 Hohl .................. G06F 21/577
726/25
(Continued)

FOREIGN PATENT DOCUMENTS

JP  2004-259197 A  9/2004
JP  2006011510 A  1/2006
(Continued)

OTHER PUBLICATIONS

Masato Terada et al., "Feasibility study of the collaboration possibility between vulnerability database and asset management by Product Identifier", IPSJ SIG Notes Distributed Processing System, Feb. 25, 2016, 9 pages.
(Continued)

*Primary Examiner* — Gary S Gracia
(74) *Attorney, Agent, or Firm* — Sughrue Mion, PLLC

(57) ABSTRACT

A security risk management system (305) of the present disclosure includes a server (310) and an agent unit (320) included in a terminal. The server (310) transmits vulnerability information to the agent unit (320) before the release date and time of the vulnerability information. The agent unit (320) investigates the presence or absence of vulnerabilities in the terminal based on information regarding a method for vulnerability investigation contained in the vulnerability information, and transmits vulnerability investigation results containing the investigation results to the server (310) before the release date and time of the vulnerability information. The server (310) presents the vulnerability information and the vulnerability investigation results on or after the release date and time of the vulnerability information.

9 Claims, 13 Drawing Sheets

(51) Int. Cl.
*G06F 21/55* (2013.01)
*G06Q 10/06* (2012.01)
*G06F 12/14* (2006.01)

(56) References Cited

U.S. PATENT DOCUMENTS

| | | | | |
|---|---|---|---|---|
| 2014/0173737 | A1* | 6/2014 | Toback | G06F 21/57 726/25 |
| 2014/0366140 | A1* | 12/2014 | Chen | G06F 21/577 726/25 |
| 2014/0373160 | A1* | 12/2014 | Shigemoto | G06F 21/577 726/25 |
| 2015/0067323 | A1* | 3/2015 | Salowey | H04L 9/3268 713/155 |
| 2015/0242515 | A1* | 8/2015 | Trabelsi | G06F 16/9535 707/710 |
| 2016/0294847 | A1* | 10/2016 | Coronado | G06F 16/23 |
| 2016/0378993 | A1* | 12/2016 | McGee | G06F 16/24578 726/25 |

FOREIGN PATENT DOCUMENTS

| | | |
|---|---|---|
| JP | 2006-504178 A | 2/2006 |
| JP | 2006-072482 A | 3/2006 |
| JP | 2007-122408 A | 5/2007 |
| JP | 2009-015570 A | 1/2009 |
| TW | I269157 B | 12/2006 |

OTHER PUBLICATIONS

Narishima Yoshitaka et al., "Shakai Infrastructure Security", Hitachi Hyoron, Mar. 1, 2014, 8 pages, vol. 96.
International Search Report for PCT/JP2017/011586 dated Jun. 27, 2017.
Communication dated Oct. 1, 2019 from the Japanese Patent Office in application No. 2016-061774.
Communication dated Sep. 6, 2019 from the Taiwanese Intellectual Property Office in application No. 106109854.

* cited by examiner

SECURITY RISK MANAGEMENT SYSTEM, SERVER, CONTROL METHOD, AND NON-TRANSITORY COMPUTER-READABLE MEDIUM

CROSS REFERENCE TO RELATED APPLICATIONS

This application is a National Stage of International Application No. PCT/JP2017/011586 filed Mar. 23, 2017, claiming priority based on Japanese Patent Application No. 2016-061774 filed Mar. 25, 2016, the disclosure of which is incorporated herein in their entirety by reference.

TECHNICAL FIELD

The present disclosure relates to a security risk management system, a server, a control method, and a non-transitory computer-readable medium.

BACKGROUND ART

Terminals used by companies are subject to security risks including vulnerabilities in hardware or software. This raises a need for companies to manage the vulnerabilities of terminals in the companies. In recent years, a security risk management system that supports the management of vulnerabilities has been proposed (e.g., Patent Literature 1).

CITATION LIST

Patent Literature

Patent Literature 1: Japanese Unexamined Patent Application Publication No. 2009-015570

SUMMARY OF INVENTION

Technical Problem

A company using a security risk management system generally manages vulnerabilities as follows.

After vulnerability information is released, a security administrator of the company investigates the presence or absence of vulnerabilities in terminals in the company by using the security risk management system.

When a vulnerable terminal is found as a result of the investigation, the security administrator of the company develops and implements countermeasures against the vulnerability by using the security risk management system However, once vulnerability information is released, there is a risk that a terminal is attacked by a malicious individual or group of individuals, and it is necessary to reduce the time needed to take countermeasures against the vulnerability.

The technique disclosed in the above-mentioned Patent Literature 1 stores, in a database, countermeasures taken against vulnerabilities of a terminal in association with a keyword indicating the type of vulnerabilities. Specifically, the technique disclosed in Patent Literature 1 is a technique that stores, in a database, countermeasures against vulnerabilities which have been actually taken in a terminal, and it is not a technique that reduces the time needed to take countermeasures against vulnerabilities.

An object of the present disclosure is to solve the above-described problem, and to provide a technique capable of reducing the time needed to take countermeasures against vulnerabilities.

Solution to Problem

According to one aspect of the present disclosure, a security risk management system includes a server, and an agent unit included in a terminal, wherein the server transmits vulnerability information to the agent unit before a release date and time of the vulnerability information, the agent unit investigates presence or absence of vulnerabilities in the terminal based on information regarding a method for vulnerability investigation contained in the vulnerability information, and transmits vulnerability investigation results containing the investigation results to the server before the release date and time of the vulnerability information, and the server presents the vulnerability information and the vulnerability investigation results on or after the release date and time of the vulnerability information.

According to one aspect of the present disclosure, a server includes a communication unit configured to transmit, to an agent unit included in a terminal, vulnerability information before a release date and time of the vulnerability information, and receives, from the agent unit, vulnerability investigation results containing investigation results regarding presence or absence of vulnerabilities in the terminal investigated by the agent unit based on information regarding a method for vulnerability investigation contained in the vulnerability information before the release date and time of the vulnerability information, and a presentation unit configured to present the vulnerability information and the vulnerability investigation results on or after the release date and time of the vulnerability information.

According to one aspect of the present disclosure, a control method is a control method of a server, including a transmission step of transmitting, to an agent unit included in a terminal, vulnerability information before a release date and time of the vulnerability information, a step of receiving, from the agent unit, vulnerability investigation results containing investigation results regarding presence or absence of vulnerabilities in the terminal investigated by the agent unit based on information regarding a method for vulnerability investigation contained in the vulnerability information before the release date and time of the vulnerability information, and a presentation step of presenting the vulnerability information and the vulnerability investigation results on or after the release date and time of the vulnerability information.

According to one aspect of the present disclosure, a non-transitory computer readable medium is a non-transitory computer readable medium storing a program causing a computer to execute a transmission step of transmitting, to an agent unit included in a terminal, vulnerability information before a release date and time of the vulnerability information, a step of receiving, from the agent unit, vulnerability investigation results containing investigation results regarding presence or absence of vulnerabilities in the terminal investigated by the agent unit based on information regarding a method for vulnerability investigation contained in the vulnerability information before a release date and time of the vulnerability information, and a presentation step of presenting the vulnerability information and the vulnerability investigation results on or after the release date and time of the vulnerability information.

According to one aspect of the present disclosure, a non-transitory computer readable medium is a non-transitory computer readable medium storing a program causing a computer to execute a receiving step of receiving, from a server, vulnerability information before a release date and time of the vulnerability information, an investigation step of investing presence or absence of vulnerabilities in a terminal based on information regarding a method for vulnerability investigation contained in the vulnerability information before a release date and time of the vulnerability information, and a step of transmitting, to the server, vulnerability investigation results containing investigation results in the investigation step before the release date and time of the vulnerability information.

Advantageous Effects of Invention

According to the exemplary aspects of the present disclosure, it is possible to reduce the time needed to take countermeasures against vulnerabilities.

DESCRIPTION OF EMBODIMENTS

Embodiments of the present disclosure are described hereinafter with reference to the drawings.

Figure 1:
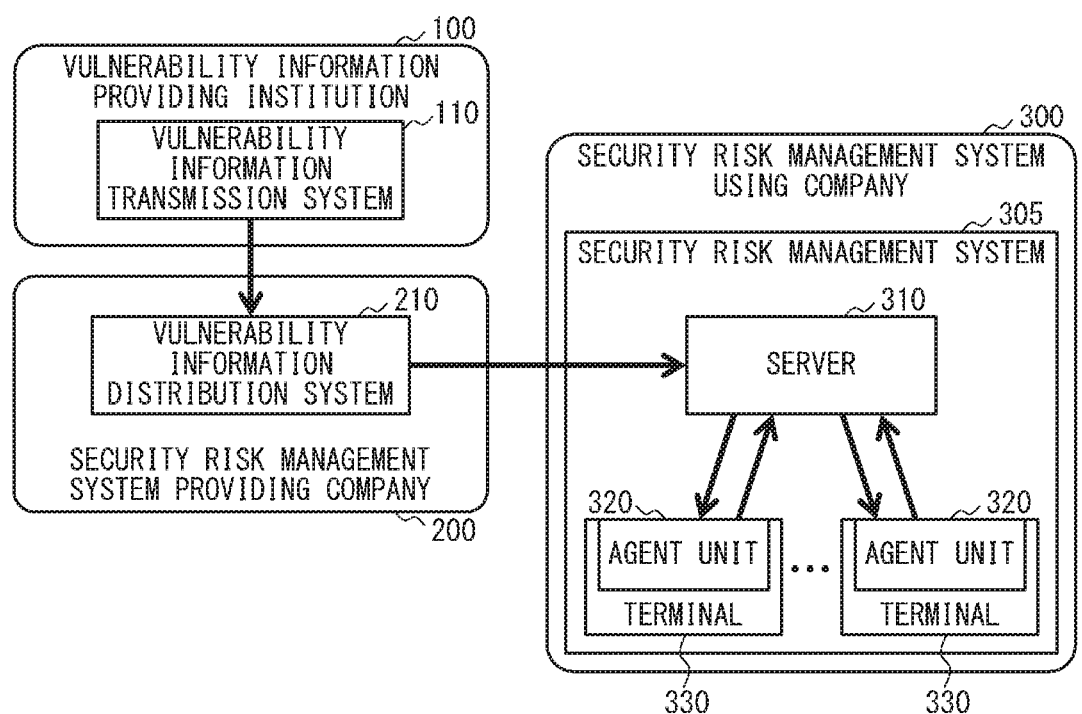
FIG. 1 is a view showing a configuration example of a security system according to a first embodiment.
Figure 2:
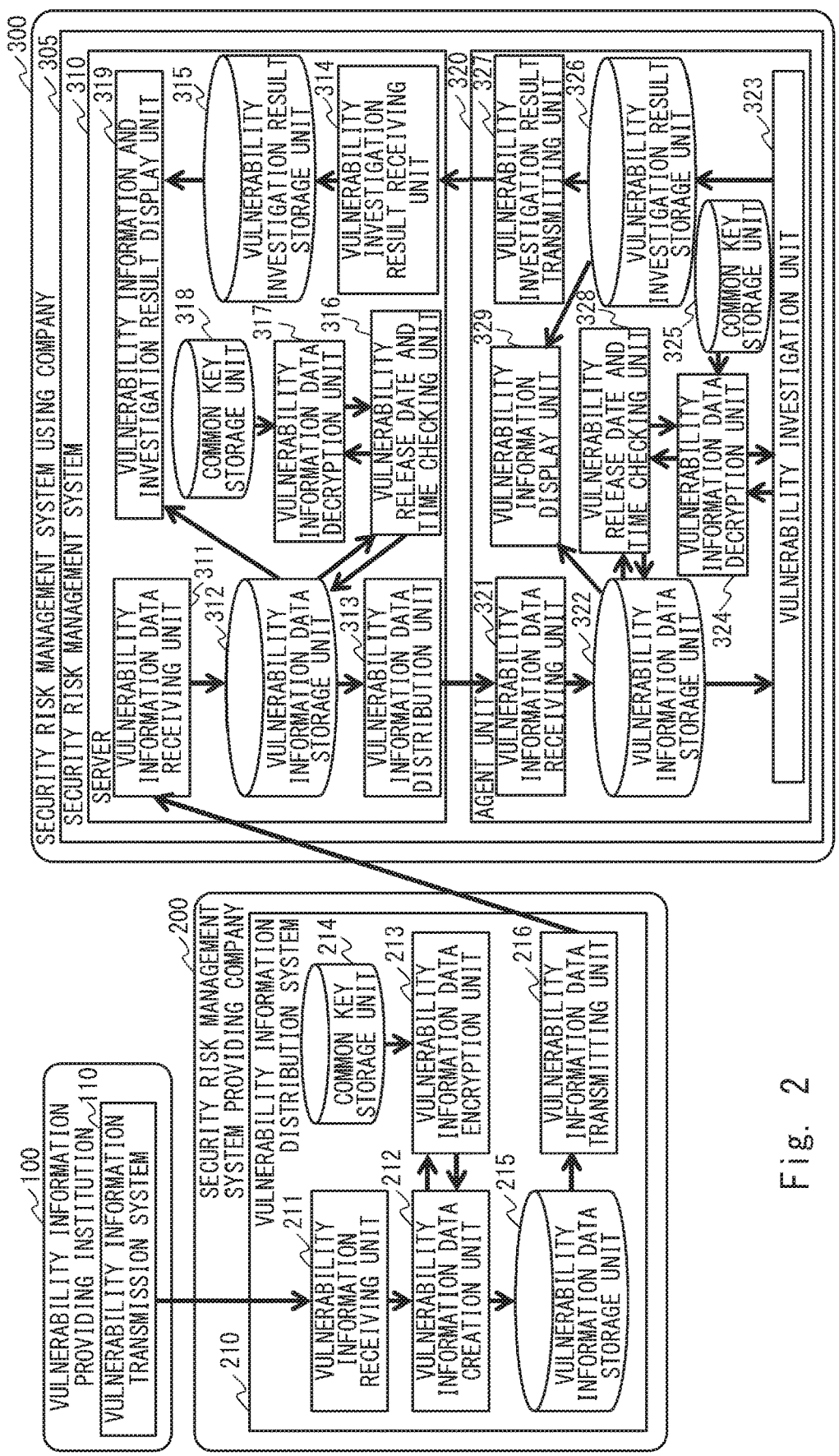
FIG. 2 is a block diagram showing a block configuration example of a vulnerability information distribution system and a security risk management system according to the first embodiment.

(1) First Embodiment (1-1) Configuration of First Embodiment (1-1-1) Overall Configuration FIG. 1 shows a configuration example of a security system according to a first embodiment. FIG. 2 shows a block configuration example of a vulnerability information distribution system 210 and a security risk management system 305 according to the first embodiment.

Referring to FIGS. 1 and 2, the security system according to the first embodiment includes a vulnerability information transmission system 110 placed in a vulnerability information providing institution 100, a vulnerability information distribution system 210 placed in a security risk management system providing company 200, and a security risk management system 305 placed in a security risk management system using company 300.

The vulnerability information providing institution 100 is an institution that provides vulnerability information including an overview of vulnerabilities, a method for investigation, a method for countermeasures and the like, and it is CERT (Computer Emergency Response Team), JPCERT (Japan Computer Emergency Response Team), IPA (Information-technology Promotion Agency) or the like, for example. The security risk management system providing company 200 is a company that provides the security risk management system 305. The security risk management system using company 300 is a company that uses the security risk management system 305 provided by the security risk management system providing company 200. The security risk management system using company 300 manages vulnerabilities in terminals 330 of its own company by using the security risk management system 305.

When software has a vulnerability, the vulnerability information providing institution 100 provides a software vendor that has created this software with vulnerability information regarding the vulnerability before its release date and time for the purpose of investigation in some cases. The vulnerability information provided from the vulnerability information providing institution 100 to the software vendor can be used by the security risk management system providing company 200. However, when it is before the release date and time of the vulnerability information, use of the vulnerability information is limited to one's own use in the security risk management system providing company 200. In this manner, the security risk management system providing company 200 is allowed to use, only in its own company, the vulnerability information provided from the vulnerability information providing institution 100 before the release date and time.

The first embodiment focuses attention on the fact that the security risk management system using company 300 can use vulnerability information before the release date and time provided by the vulnerability information providing institution 100, and completes the investigation regarding the presence or absence of vulnerabilities in the terminals 330 by using the vulnerability information before the release date and time.

(1-1-2) Configuration of Vulnerability Information Transmission System 110

The vulnerability information transmission system 110 transmits vulnerability information to the vulnerability information distribution system 210. Note that the vulnerability information transmission system 110 only needs to have the function of transmitting vulnerability information to the vulnerability information distribution system 210, and this function can be implemented by a known technique, and therefore the description of its detailed block configuration is omitted.

(1-1-3) Configuration of Vulnerability Information Distribution System 210

The vulnerability information distribution system 210 includes a vulnerability information receiving unit 211, a vulnerability information data creation unit 212, a vulnerability information data encryption unit 213, a common key storage unit 214, a vulnerability information data storage unit 215, and a vulnerability information data transmitting unit 216.

The vulnerability information receiving unit 211 receives vulnerability information from the vulnerability information transmission system 110. The vulnerability information data creation unit 212 creates vulnerability information data in accordance with an operation performed by a vulnerability information data creator based on the vulnerability information received by the vulnerability information receiving unit 211. The vulnerability information data encryption unit 213 encrypts the vulnerability information data created by the vulnerability information data creation unit 212 by using a common key. The common key storage unit 214 stores the common key to be used when the vulnerability information data encryption unit 213 encrypts the vulnerability information data. The vulnerability information data storage unit 215 stores the vulnerability information data created by the vulnerability information data creation unit 212. The vulnerability information data transmitting unit 216 reads the vulnerability information data from the vulnerability information data storage unit 215, and transmits the read vulnerability information data to a server 310.

(1-1-4) Configuration of Security Risk Management System 305

The security risk management system 305 includes a server 310 and an agent unit 320. The agent unit 320 is software which is also called agent software or agent. The agent unit 320 corresponds to the terminal 330 whose vulnerabilities are managed by the security risk management system using company 300, and it is installed into the corresponding terminal 330. In FIG. 1, it is assumed that there are a plurality of terminals 330, and a plurality of agent units 320 respectively corresponding to the plurality of terminals 330 are placed; however, when there is one terminal 330, one agent unit 320 is placed.

The server 310 receives vulnerability information data from the vulnerability information distribution system 210, transmits the received vulnerability information data to the agent unit 320, and gives an instruction to conduct vulnerability investigation before the release date and time of vulnerability information. Further, the server 310 receives vulnerability investigation results from the agent unit 320, and displays the vulnerability information and the vulnerability investigation results on or after the release date and time of the vulnerability information. On the other hand, the agent unit 320 receives vulnerability information data from the server 310, investigates the presence or absence of vulnerabilities in the corresponding terminal 330, and transmits vulnerability investigation results to the server 310 before the release date and time of vulnerability information. Further, the agent unit 320 displays the vulnerability information on or after the release date and time of the vulnerability information.

(1-1-5) Configuration of Server 310

The server 310 includes a vulnerability information data receiving unit 311, a vulnerability information data storage unit 312, a vulnerability information data distribution unit 313, a vulnerability investigation result receiving unit 314, a vulnerability investigation result storage unit 315, a vulnerability release date and time checking unit 316, a vulnerability information data decryption unit 317, a common key storage unit 318, and a vulnerability information and investigation result display unit 319. Note that the vulnerability information data distribution unit 313 and the vulnerability investigation result receiving unit 314 are an example of elements of a communication unit. The vulnerability information and investigation result display unit 319 is an example of a presentation unit. The vulnerability information data storage unit 312 is an example of a vulnerability information storage unit. The vulnerability release date and time checking unit 316 is an example of a release date and time checking unit. The vulnerability investigation result storage unit 315 is an example of a vulnerability investigation result storage unit.

The vulnerability information data receiving unit 311 receives vulnerability information data from the vulnerability information distribution system 210. The vulnerability information data storage unit 312 stores the vulnerability information data received by the vulnerability information data receiving unit 311. The vulnerability information data distribution unit 313 reads the vulnerability information data from the vulnerability information data storage unit 312, and transmits the read vulnerability information data to the agent unit 320. The vulnerability investigation result receiving unit 314 receives vulnerability investigation results from the agent unit 320. The vulnerability investigation result storage unit 315 stores the vulnerability investigation results received by the vulnerability investigation result receiving unit 314. The vulnerability release date and time checking unit 316 reads the vulnerability information data from the vulnerability information data storage unit 312 on a regular basis, checks the release date and time, makes the vulnerability information data decryption unit 317 decrypt the vulnerability information data whose release date and time has passed, and writes the decrypted vulnerability information data back into the vulnerability information data storage unit 312. The vulnerability information data decryption unit 317 receives the vulnerability information data from the vulnerability release date and time checking unit 316, and decrypts the vulnerability information data by using a common key. The common key storage unit 318 stores the common key to be used when the vulnerability information data decryption unit 317 decrypts the vulnerability information data. The vulnerability information and investigation result display unit 319 reads the vulnerability information data whose release date and time has passed from the vulnerability information data storage unit 312, reads the corresponding vulnerability investigation results from the vulnerability investigation result storage unit 315 based on the read vulnerability information data, and presents the vulnerability information and the vulnerability investigation results based on the read vulnerability investigation results. It is assumed hereinafter that the presentation is to display the information and the results on a screen of the server 310.

(1-1-6) Configuration of Agent Unit 320

The agent unit 320 includes a vulnerability information data receiving unit 321, a vulnerability information data storage unit 322, a vulnerability investigation unit 323, a vulnerability information data decryption unit 324, a common key storage unit 325, a vulnerability investigation result storage unit 326, a vulnerability investigation result transmitting unit 327, a vulnerability release date and time checking unit 328, and a vulnerability information display unit 329. Note that the vulnerability information data receiving unit 321 and the vulnerability investigation result transmitting unit 327 are an example of components of a communication unit. The vulnerability information display unit 329 is an example of a presentation unit. The vulnerability information data storage unit 322 is an example of a vulnerability information storage unit. The vulnerability release date and time checking unit 328 is an example of a release date and time checking unit. The vulnerability investigation result storage unit 326 is an example of a vulnerability investigation result storage unit.

The vulnerability information data receiving unit 321 receives vulnerability information data from the server 310. The vulnerability information data storage unit 322 stores the vulnerability information data received by the vulnerability information data receiving unit 321. The vulnerability investigation unit 323 reads the vulnerability information data from the vulnerability information data storage unit 322, makes the vulnerability information data decryption unit 324 decrypt the read vulnerability information data, investigates the presence or absence of vulnerabilities in the corresponding terminal 330 based on a method for investigation contained in the decrypted vulnerability information data, and stores vulnerability investigation results containing results of the investigation into the vulnerability investigation result storage unit 326. The vulnerability information data decryption unit 324 receives the vulnerability information data from the vulnerability investigation unit 323 and the vulnerability release date and time checking unit 328, and decrypts the vulnerability information data by using a common key. The common key storage unit 325 stores the common key to be used when the vulnerability information data decryption unit 324 decrypts the vulnerability information data. The vulnerability investigation result storage unit 326 stores the vulnerability investigation results containing the investigation results investigated by the vulnerability investigation unit 323. The vulnerability investigation result transmitting unit 327 reads the vulnerability investigation results from the vulnerability investigation result storage unit 326, and transmits the read vulnerability investigation results to the server 310. The vulnerability release date and time checking unit 328 reads the vulnerability information data from the vulnerability information data storage unit 322 on a regular basis, checks the release date and time, makes the vulnerability information data decryption unit 324 decrypt the vulnerability information data whose release date and time has passed, and writes the decrypted vulnerability information data back into the vulnerability information data storage unit 322. The vulnerability information display unit 329 reads the vulnerability information data whose release date and time has passed from the vulnerability information data storage unit 322, reads the corresponding vulnerability investigation results from the vulnerability investigation result storage unit 326 based on the read vulnerability information data, and presents the vulnerability information based on the read vulnerability investigation results. It is assumed hereinafter that the presentation is to display the information on a screen of the corresponding terminal 330.

Note that the common key storage unit 214 in the vulnerability information distribution system 210, the common key storage unit 318 in the server 310, and the common key storage unit 325 in the agent unit 320 share a common key, and store the shared common key.

(1-1-7) Hardware Configuration

Figure 3:
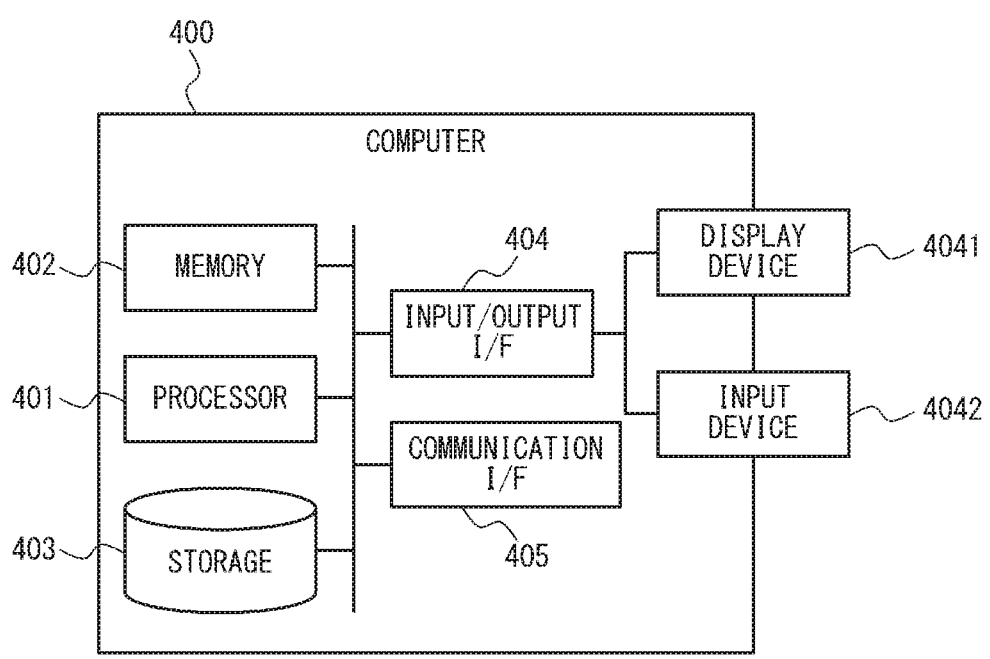
FIG. 3 is a view showing a configuration example of the hardware configuration of a computer that implements the vulnerability information distribution system, a server and a terminal according to the first embodiment.

FIG. 3 shows a configuration example of the hardware configuration of a computer 400 for implementing the vulnerability information distribution system 210 according to the first embodiment. Referring to FIG. 3, the vulnerability information distribution system 210 according to the first embodiment can be implemented by the computer 400. The computer 400 includes a processor 401, a memory 402, a storage 403, an input/output interface (input/output I/F) 404, a communication interface (communication I/F) 405 and the like. The processor 401, the memory 402, the storage 403, the input/output interface 404 and the communication interface 405 are connected through a data transmission line for transmitting and receiving data to and from one another.

The processor 401 is a processing unit such as CPU (Central Processing Unit) or GPU (Graphics Processing Unit). The memory 402 is a memory such as RAM (Random Access Memory) or ROM (Read Only Memory). The storage 403 is a storage device such as HDD (Hard Disk Drive), SSD (Solid State Drive) or memory card. Alternatively, the storage 403 may be a memory such as RAM or ROM.

The storage 403 stores a program for implementing the function of each processing unit (the vulnerability information receiving unit 211, the vulnerability information data creation unit 212, the vulnerability information data encryption unit 213, the vulnerability information data transmitting unit 216 etc.) included in the vulnerability information distribution system 210. The processor 401 executes each program and thereby implements the function of each processing unit. The processor 401 may execute each program after reading the program onto the memory 402, or may execute each program without reading it onto the memory 402. Further, the memory 402 and the storage 403 serve also as the common key storage unit 214 and the vulnerability information data storage unit 215.

The above-described program can be stored and provided to the computer (which includes computer 400) using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The input/output interface 404 is connected with a display device 4041, an input device 4042 and the like. The display device 4041 is a device that displays a screen corresponding to drawing data processed by the processor 401, such as LCD (Liquid Crystal Display) or CRT (Cathode Ray Tube) display. The input device 4042 is a device that receives an operation input by an operator, such as a keyboard, a mouse or a touch sensor, for example. The display device 4041 and the input device 4042 may be integrated and implemented as a touch panel.

The communication interface 405 transmits and receives data to and from an external device. For example, the communication interface 405 communicates with an external device through a wired or wireless network.

Note that the server 310 and the terminal 330 can be implemented by the computer 400 shown in FIG. 3.

For example, in the case where the server 310 is implemented by the computer 400, the storage 403 stores a program for implementing the function of each processing unit (the vulnerability information data receiving unit 311, the vulnerability information data distribution unit 313, the vulnerability investigation result receiving unit 314, the vulnerability release date and time checking unit 316, the vulnerability information data decryption unit 317, the vulnerability information and investigation result display unit 319 etc.) included in the server 310. Further, the memory 402 and the storage 403 serve also as the vulnerability information data storage unit 312, the vulnerability investigation result storage unit 315 and the common key storage unit 318.

In the case where the terminal 330 is implemented by the computer 400, the storage 403 stores a program for implementing the function of each processing unit (the vulnerability information data receiving unit 321, the vulnerability investigation unit 323, the vulnerability information data decryption unit 324, the vulnerability investigation result transmitting unit 327, the vulnerability release date and time checking unit 328, the vulnerability information display unit 329 etc.) included in the agent unit 320. Further, the memory 402 and the storage 403 serve also as the vulnerability information data storage unit 322, the common key storage unit 325 and the vulnerability investigation result storage unit 326.

(1-2) Operation of First Embodiment

The operation of the security system according to the first embodiment is described hereinafter in detail.

(1-2-1) First, the operation of the vulnerability information distribution system 210 that receives vulnerability information from the vulnerability information transmission system 110, creates vulnerability information data and transmits it to the server 310 is described with reference to FIG. 4.

Figure 4:
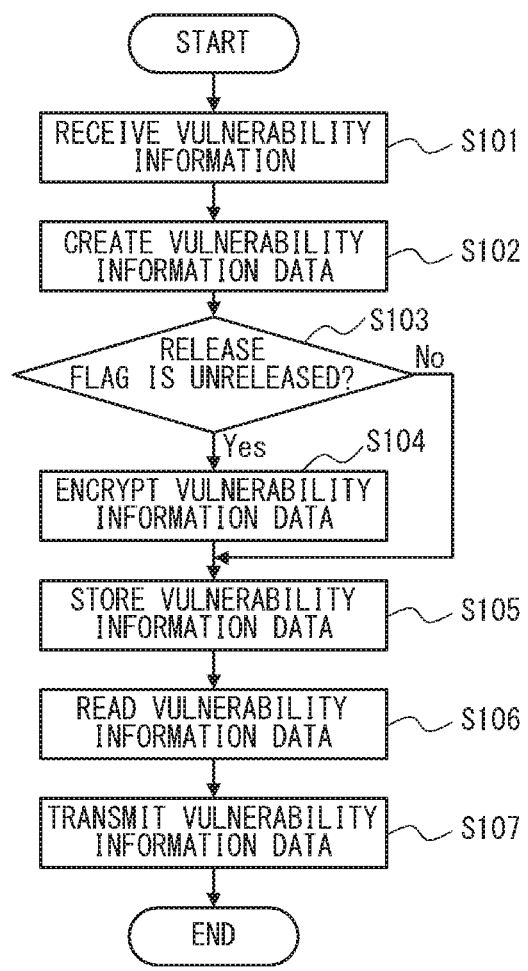
FIG. 4 is a flowchart showing an operation example that receives vulnerability information from a vulnerability information transmission system, creates vulnerability information data, and transmits the vulnerability information data to a server in the vulnerability information distribution system according to the first embodiment.

Referring to FIG. 4, in the vulnerability information distribution system 210, the vulnerability information receiving unit 211 receives vulnerability information transmitted from the vulnerability information transmission system 110 (S101). The vulnerability information contains information about an overview of vulnerabilities, information about a method for investigation, information about a method for countermeasures, and information about a release date and time. The vulnerability information receiving unit 211 transmits the received vulnerability information to the vulnerability information data creation unit 212. The vulnerability information data creation unit 212 creates vulnerability information data in accordance with an operation performed by a vulnerability information data creator based on the vulnerability information (S102).

Figure 5:
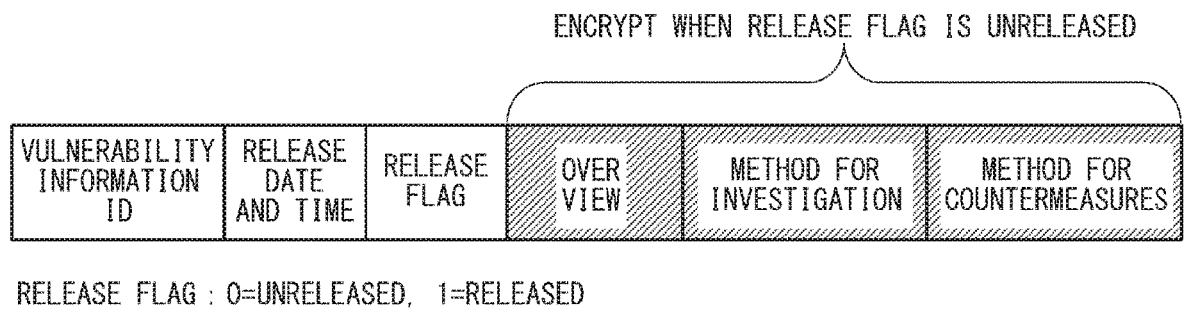
FIG. 5 is a view showing an example of vulnerability information data according to the first embodiment.

As shown in FIG. 5, the vulnerability information data has a format that contains a vulnerability information ID (Identifier), information about a release date and time, a release flag, information about an overview, information about a method for investigation, and information about a method for countermeasures. The vulnerability information data corresponds to data created by adding a vulnerability information ID and a release flag to the vulnerability information (an overview of vulnerabilities, a method for investigation, a method for countermeasures, and a release date and time). An ID for uniquely identifying the vulnerability information, which is assigned by the vulnerability information data creation unit 212, is set to the vulnerability information ID. Information about the release date and time contained in the vulnerability information is set to the release date and time. 0, which indicates "unreleased", is set to the release flag when the release date and time is after the current date and time, and 1, which indicates "released" is set to the release flag when the release date and time is before the current date and time. The overview, the method for investigation and the method for countermeasures contained in the vulnerability information are respectively set to the overview, the method for investigation and the method for countermeasures.

When 0, which indicates "unreleased", is set to the release flag of the vulnerability information data (Yes in S103), the vulnerability information data creation unit 212 transmits the vulnerability information data to the vulnerability information data encryption unit 213. The vulnerability information data encryption unit 213 reads a common key from the common key storage unit 214, encrypts information about an overview, a method for investigation and a method for countermeasures in the vulnerability information data by using the read common key (S104), and sends the encrypted vulnerability information data back to the vulnerability information data creation unit 212. The vulnerability information data creation unit 212 stores the vulnerability information data encrypted by the vulnerability information data encryption unit 213 into the vulnerability information data storage unit 215 (S105). On the other hand, when 1, which indicates "released", is set to the vulnerability information data (No in S103), the vulnerability information data creation unit 212 stores the vulnerability information data into the vulnerability information data storage unit 215 without encrypting it (S105). The vulnerability information data transmitting unit 216 reads the vulnerability information data from the vulnerability information data storage unit 215 (S106), and transmits the read vulnerability information data to the server 310 (S107).

(1-2-2) Next, the operation of the server 310 that receives vulnerability information data from the vulnerability information distribution system 210 and transmits vulnerability information data to the agent unit 320 is described with reference to FIG. 6.

Figure 6:
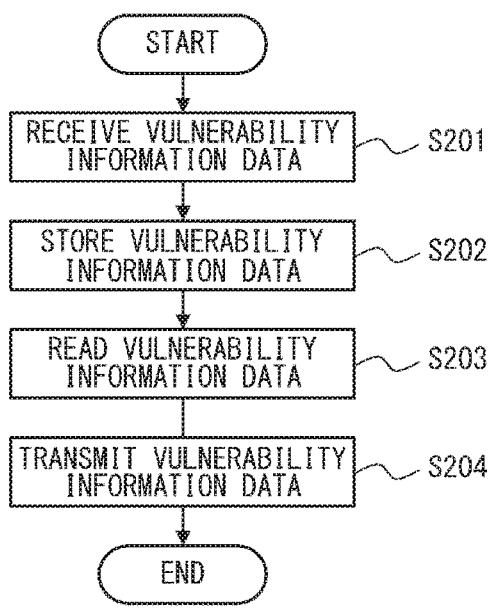
FIG. 6 is a flowchart showing an operation example that receives vulnerability information data from a vulnerability information distribution system and transmits the vulnerability information data to an agent unit in the server according to the first embodiment.

Referring to FIG. 6, in the server 310, the vulnerability information data receiving unit 311 receives vulnerability information data transmitted from the vulnerability information distribution system 210 (S201). The vulnerability information data receiving unit 311 stores the received vulnerability information data into the vulnerability information data storage unit 312 (S202). The vulnerability information data distribution unit 313 reads the vulnerability information data from the vulnerability information data storage unit 312 (S203), and transmits the read vulnerability information data to the agent unit 320 (S204).

In the case where there are a plurality of agent units 320, the server 310 transmits the vulnerability information data to each of the plurality of agent units 320.

(1-2-3) The operation of the agent unit 320 that receives vulnerability information data from the server 310, investigates the presence or absence of vulnerabilities in the corresponding terminal 330, and transmits vulnerability investigation results indicating results of the investigation to the server 310 is described with reference to FIG. 7.

Figure 7:
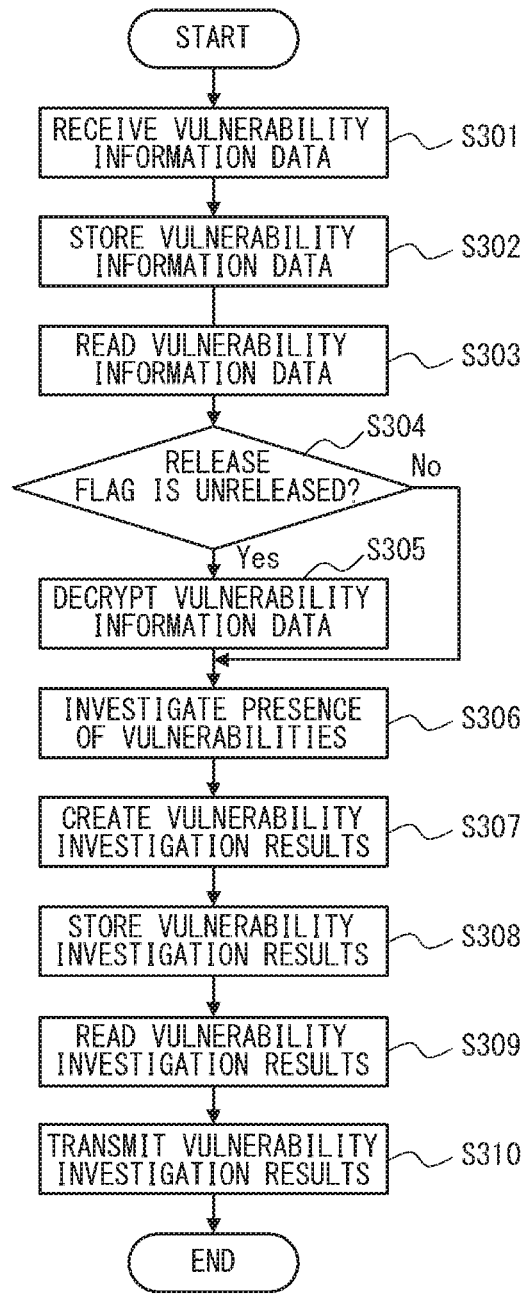
FIG. 7 is a flowchart showing an operation example that receives vulnerability information data from a server, investigates the presence or absence of vulnerabilities of a corresponding terminal, and transmits vulnerability investigation results to a server in the agent unit according to the first embodiment.

Referring to FIG. 7, in the agent unit 320, the vulnerability information data receiving unit 321 receives the vulnerability information data transmitted from the server 310 (S301). The vulnerability information data receiving unit 321 stores the received vulnerability information data into the vulnerability information data storage unit 322 (S302). The vulnerability investigation unit 323 reads the vulnerability information data from the vulnerability information data storage unit 322 (S303). When 0, which indicates "unreleased", is set to the release flag of the read vulnerability information data (Yes in S304), the vulnerability investigation unit 323 transmits the vulnerability information data to the vulnerability information data decryption unit 324. The vulnerability information data decryption unit 324 reads a common key for decryption from the common key storage unit 325, decrypts the information about the method for investigation in the vulnerability information data by using the read common key (S305), and sends the decrypted vulnerability information data back to the vulnerability investigation unit 323. The vulnerability investigation unit 323 investigates the presence or absence of vulnerabilities in the corresponding terminal 330 based on the information about the method for investigation in the vulnerability information data decrypted by the vulnerability information data decryption unit 324 (S306). On the other hand, when 1, which indicates "released", is set to the release flag of the read vulnerability information data (No in S304), because the information about the method for investigation in the read vulnerability information data is not decrypted, the vulnerability investigation unit 323 investigates the presence or absence of vulnerabilities in the corresponding terminal 330 based on the information about the method for investigation (S306). The vulnerability investigation unit 323 creates vulnerability investigation results indicating investigation results regarding the presence or absence of vulnerabilities in the corresponding terminal 330 (S307).

Figures 8, 9:
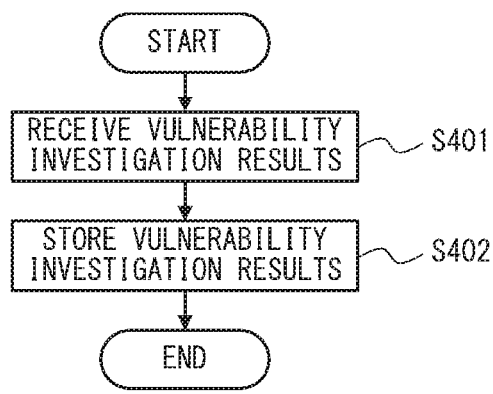
FIG. 8 is a view showing an example of vulnerability investigation results according to the first embodiment.
FIG. 9 is a flowchart showing an operation example that receives vulnerability investigation results from an agent unit and stores the vulnerability investigation results into a vulnerability investigation result storage unit in the server according to the first embodiment.

The vulnerability investigation results have a format that contains a vulnerability information ID, a terminal ID, information about an investigation date and time, information about investigation results as shown in FIG. 8. An ID for uniquely identifying the vulnerability information related to the investigated vulnerabilities, which is the vulnerability information ID contained in the vulnerability information data, is set to the vulnerability information ID. An ID for identifying the investigated terminal 330 is set to the terminal ID. Information about the date and time when investigation is conducted is set to the investigation date and time. 0 is set to the investigation results when there are no vulnerabilities in the terminal 330, and 1 is set to the investigation results when there are vulnerabilities in the terminal 330.

The vulnerability investigation unit 323 stores the created vulnerability investigation results into the vulnerability investigation result storage unit 326 (S308). The vulnerability investigation result transmitting unit 327 reads the vulnerability investigation results from the vulnerability investigation result storage unit 326 (S309) and transmits the read vulnerability investigation results to the server 310 (S310).

In the case where there are a plurality of agent units 320, each of the plurality of agent units 320 performs the operation of FIG. 7 described above.

(1-2-4) The operation of the server 310 that receives vulnerability investigation results from the agent unit 320 and stores the vulnerability investigation results into the vulnerability investigation result storage unit 315 is described with reference to FIG. 9.

Referring to FIG. 9, in the server 310, the vulnerability investigation result receiving unit 314 receives the vulnerability investigation results transmitted from the agent unit 320 (S401). The vulnerability investigation result receiving unit 314 stores the received vulnerability investigation results into the vulnerability investigation result storage unit 315 (S402).

In the case where there are a plurality of agent units 320, the server 310 stores the vulnerability investigation results received from each of the plurality of agent units 320 into the vulnerability investigation result storage unit 315.

(1-2-5) The operation of the server 310 that regularly checks the vulnerability information data in the vulnerability information data storage unit 312, decrypts the vulnerability information data whose release date and time is before the current date and time, and stores the decrypted vulnerability information data again into the vulnerability information data storage unit 312 is described with reference to FIG. 10.

Figure 10:
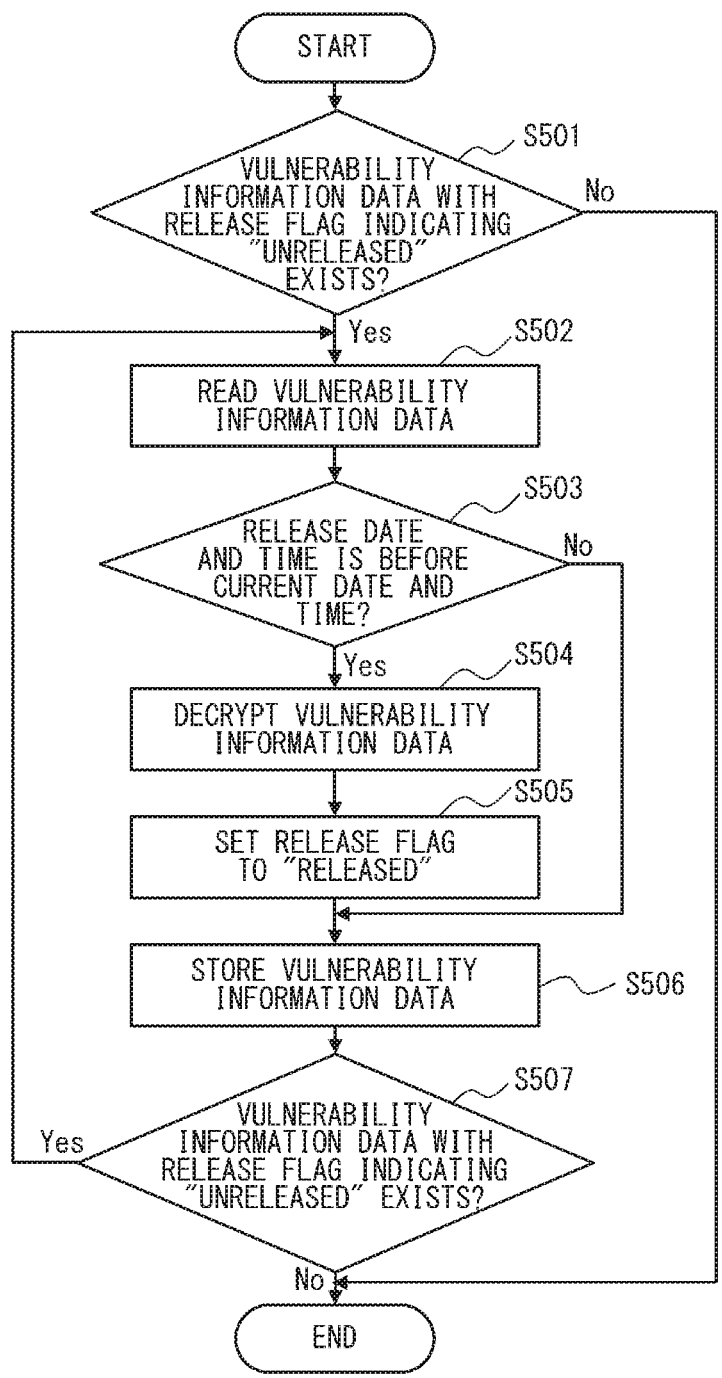
FIG. 10 is a flowchart showing an operation example that regularly checks vulnerability information data in a vulnerability information data storage unit, decrypts the vulnerability information data whose release date and time is before the current date and time, and stores the decrypted vulnerability information data again into the vulnerability information data storage unit in the server according to the first embodiment.

Referring to FIG. 10, in the server 310, the vulnerability release date and time checking unit 316 checks whether or not the vulnerability information data whose release flag is 0 indicating "unreleased" is stored in the vulnerability information data storage unit 312 on a regular basis (e.g., once in 10 minutes) (S501), and when such vulnerability information data is stored (Yes in S501), the vulnerability release date and time checking unit 316 reads one of such vulnerability information data (S502). When the release date and time of the read vulnerability information data is before the current date and time (Yes in S503), the vulnerability release date and time checking unit 316 transmits the vulnerability information data to the vulnerability information data decryption unit 317. The vulnerability information data decryption unit 317 reads a common key for decryption from the common key storage unit 318, decrypts information about the overview, the method for investigation and the method for countermeasures in the vulnerability information data by using the read common key (S504), and sends the decrypted vulnerability information data back to the vulnerability release date and time checking unit 316. The vulnerability release date and time checking unit 316 sets 1, which indicates "released", to the release flag of the decrypted vulnerability information data (S505). The vulnerability release date and time checking unit 316 stores the decrypted vulnerability information data where 1 is set to its release flag again into the vulnerability information data storage unit 312 (S506). On the other hand, when the release date and time of the read vulnerability information data is after the current date and time (No in S503), the vulnerability release date and time checking unit 316 stores the read vulnerability information data again into the vulnerability information data storage unit 312 without making any change (S506). Processing on the vulnerability information data read in S502 thereby ends. When the vulnerability information data whose release flag is 0 indicating "unreleased" is still stored in the vulnerability information data storage unit 312 (Yes in S507), the vulnerability release date and time checking unit 316 returns to the processing in S502. On the other hand, when the vulnerability information data whose release flag is 0 indicating "unreleased" is not stored in the vulnerability information data storage unit 312 anymore (No in S501 and No in S507), the vulnerability release date and time checking unit 316 ends the process.

(1-2-6) The operation of the server 310 that displays the vulnerability information and the vulnerability investigation results is described with reference to FIG. 11.

Figure 11:
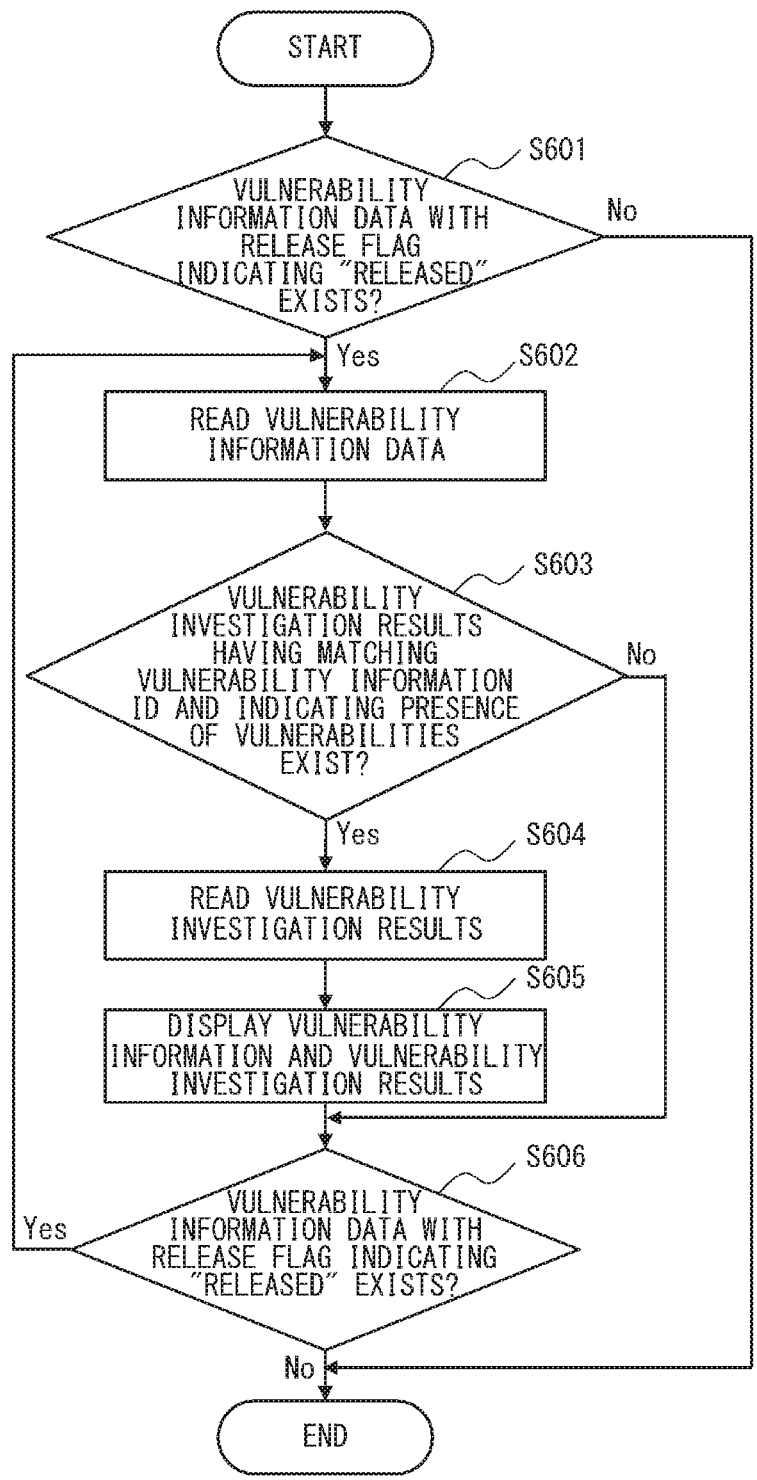
FIG. 11 is a flowchart showing an operation example that displays vulnerability information and vulnerability investigation results in the server according to the first embodiment.

Referring to FIG. 11, in the server 310, the vulnerability information and investigation result display unit 319 checks whether or not the vulnerability information data whose release flag is 1 indicating "released" is stored in the vulnerability information data storage unit 312 (S601), and when such vulnerability information data is stored (Yes in S601), the vulnerability information and investigation result display unit 319 reads one of such vulnerability information data (S602). When the vulnerability investigation results having a matching vulnerability information ID with the read vulnerability information data and whose investigation results are 1 indicating the presence of vulnerabilities are stored in the vulnerability investigation result storage unit 315 (Yes in S603), the vulnerability information and investigation result display unit 319 reads all of such vulnerability investigation results (S604). The vulnerability information and investigation result display unit 319 displays, on a screen of the server 310, the overview and the method for investigation in the read vulnerability information data and a list of the terminal IDs in the read vulnerability investigation results (S605). On the other hand, when the vulnerability investigation results having a matching vulnerability information ID with the read vulnerability information data and whose investigation results are 1 indicating the presence of vulnerabilities are not stored in the vulnerability investigation result storage unit 315 (No in S603), the vulnerability information and investigation result display unit 319 does not display the results on the screen of the server 310. Processing on the vulnerability information data read in S602 thereby ends. When the vulnerability information data whose release flag is 1 indicating "released" is still stored in the vulnerability information data storage unit 312 (Yes in S606), the vulnerability information and investigation result display unit 319 returns to the processing in S602. On the other hand, when the vulnerability information data whose release flag is 1 indicating "released" is not stored in the vulnerability information data storage unit 312 anymore (No in S601 and No in S606), the vulnerability information and investigation result display unit 319 ends the process.

Note that the timing to start the operation of FIG. 11 may be regular timing, or it may be timing when an operation indicating display of vulnerability information and vulnerability investigation results is performed.

(1-2-7) The operation of the agent unit 320 that regularly checks the vulnerability information data in the vulnerability information data storage unit 322, decrypts the vulnerability information data whose release date and time is before the current date and time, and stores the decrypted vulnerability information data again into the vulnerability information data storage unit 322 is described with reference to FIG. 12.

Figure 12:
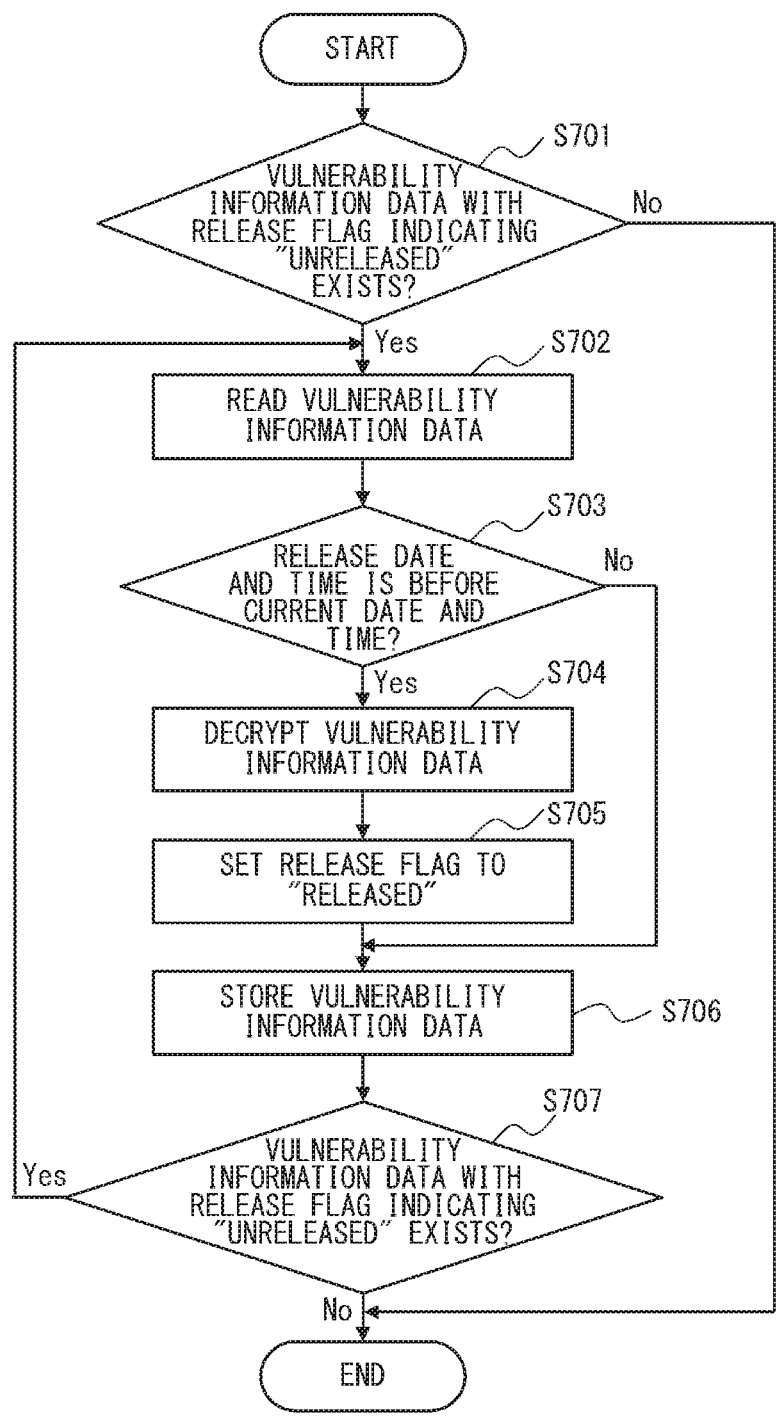
FIG. 12 is a flowchart showing an operation example that regularly checks vulnerability information data in a vulnerability information data storage unit, decrypts the vulnerability information data whose release date and time is before the current date and time, and stores the decrypted vulnerability information data again into the vulnerability information data storage unit in the agent unit according to the first embodiment.

Referring to FIG. 12, in the agent unit 320, the vulnerability release date and time checking unit 328 checks whether or not the vulnerability information data whose release flag is 0 indicating "unreleased" is stored in the vulnerability information data storage unit 322 on a regular basis (e.g., once in 10 minutes) (S701), and when such vulnerability information data is stored (Yes in S701), the vulnerability release date and time checking unit 328 reads one of such vulnerability information data (S702). When the release date and time of the read vulnerability information data is before the current date and time (Yes in S703), the vulnerability release date and time checking unit 328 transmits the vulnerability information data to the vulnerability information data decryption unit 324. The vulnerability information data decryption unit 324 reads a common key for decryption from the common key storage unit 325, decrypts information about the overview, the method for investigation and the method for countermeasures in the vulnerability information data by using the read common key (S704), and sends the decrypted vulnerability information data back to the vulnerability release date and time checking unit 328 The vulnerability release date and time checking unit 328 sets 1, which indicates "released", to the release flag of the decrypted vulnerability information data (S705). The vulnerability release date and time checking unit 328 stores the decrypted vulnerability information data where 1 is set to its release flag again into the vulnerability information data storage unit 322 (S706). On the other hand, when the release date and time of the read vulnerability information data is after the current date and time (Yes in S703), the vulnerability release date and time checking unit 328 stores the read vulnerability information data again into the vulnerability information data storage unit 322 without making any change (S706). Processing on the vulnerability information data read in S702 thereby ends. When the vulnerability information data whose release flag is 0 indicating "unreleased" is still stored in the vulnerability information data storage unit 322 (Yes in S707), the vulnerability release date and time checking unit 328 returns to the processing in S702. On the other hand, when the vulnerability information data whose release flag is 0 indicating "unreleased" is not stored in the vulnerability information data storage unit 322 anymore (No in S701 and No in S707), the vulnerability release date and time checking unit 328 ends the process.

In the case where there are a plurality of agent units 320, each of the plurality of agent units 320 performs the operation of FIG. 12 described above.

(1-2-8) The operation of the agent unit 320 that displays the vulnerability information is described with reference to FIG. 13.

Figure 13:
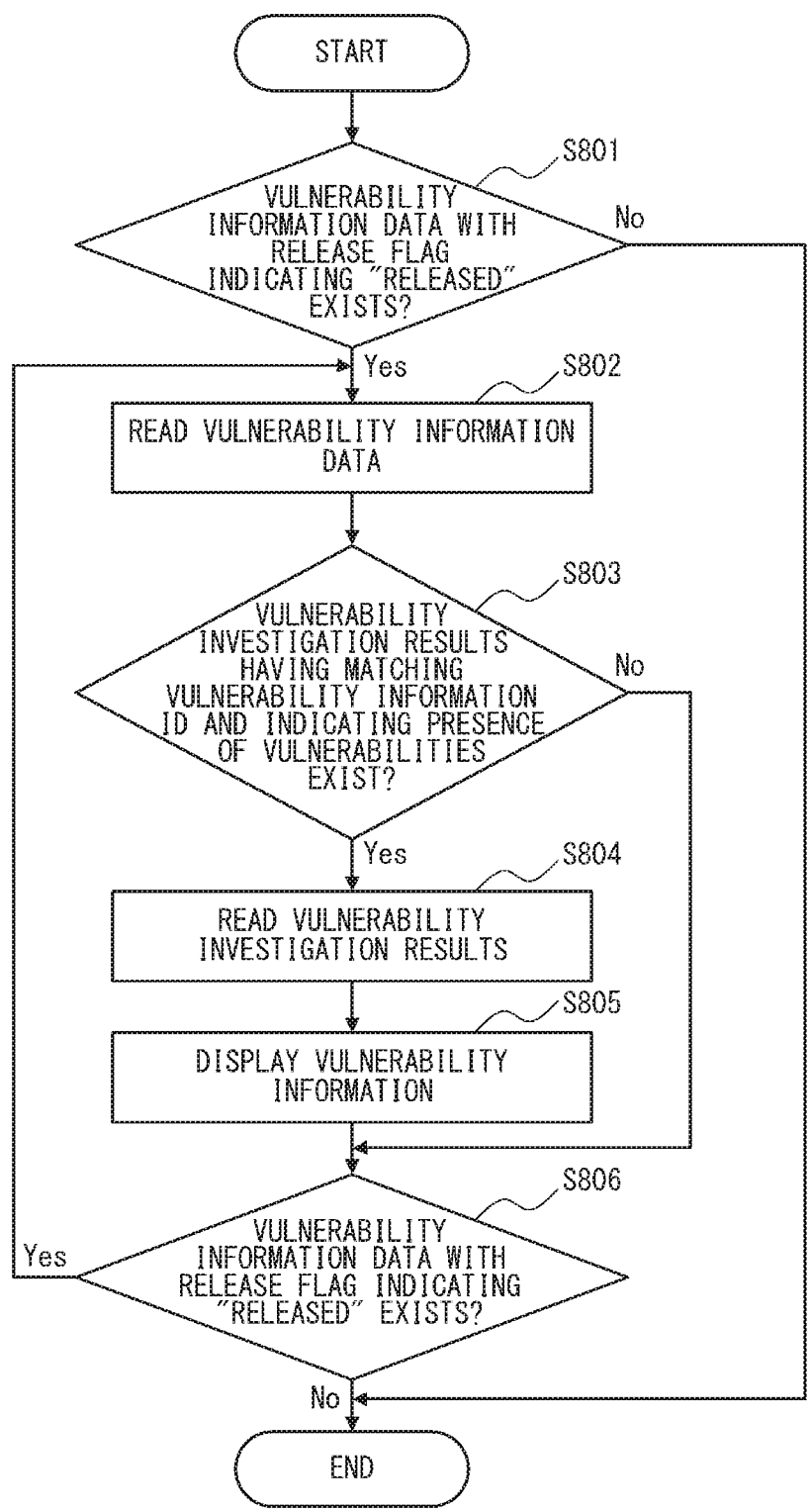
FIG. 13 is a flowchart showing an operation example that displays vulnerability information in the agent unit according to the first embodiment.

Referring to FIG. 13, in the agent unit 320, the vulnerability information display unit 329 checks whether or not the vulnerability information data whose release flag is 1 indicating "released" is stored in the vulnerability information data storage unit 322 (S801), and when such vulnerability information data is stored (Yes in S801), the vulnerability information display unit 329 reads one of such vulnerability information data (S802). When the vulnerability investigation results having a matching vulnerability information ID with the read vulnerability information data and whose investigation results are 1 indicating the presence of vulnerabilities are stored in the vulnerability investigation result storage unit 326 (Yes in S803), the vulnerability information display unit 329 reads such vulnerability investigation results (S804). The vulnerability information display unit 329 displays, on a screen of the corresponding terminal 330, the overview and the method for investigation in the read vulnerability information data (S805). On the other hand, when the vulnerability investigation results having a matching vulnerability information ID with the read vulnerability information data and whose investigation results are 1 indicating the presence of vulnerabilities are not stored in the vulnerability investigation result storage unit 326 (No in S803), the vulnerability information display unit 329 does not display the results on the screen of the corresponding terminal 330. Processing on the vulnerability information data read in S802 thereby ends. When the vulnerability information data whose release flag is 1 indicating "released" is still stored in the vulnerability information data storage unit 322 (Yes in S806), the vulnerability information display unit 329 returns to the processing in S802. On the other hand, when the vulnerability information data whose release flag is 1 indicating "released" is not stored in the vulnerability information data storage unit 322 anymore (No in S801 and No in S806), the vulnerability information display unit 329 ends the process.

Note that the timing to start the operation of FIG. 13 may be regular timing, or it may be timing when an operation indicating display of vulnerability information is performed.

In the case where there are a plurality of agent units 320, each of the plurality of agent units 320 performs the operation of FIG. 13 described above.

(1-3) Effects of First Embodiment

As described above, according to the first embodiment, the server 310 transmits encrypted vulnerability information to the agent unit 320 so that the investigation regarding the presence or absence of vulnerabilities in the terminal 330 is completed before a release date and time, and then displays vulnerability investigation results on or after the release date and time.

Therefore, a security administrator of the security risk management system using company 300 can know investigation results regarding the presence or absence of vulnerabilities in the terminals 330 of its own company on the release date and time of the vulnerability information, and immediately take the next step of developing countermeasures against vulnerabilities. It is thereby possible to reduce the time needed to take countermeasures against vulnerabilities.

It should be noted that, according to the first embodiment, the vulnerability information is decrypted for vulnerability investigation before a release date and time of the vulnerability information in the security risk management system 305. However, the decrypted vulnerability information is displayed on or after the release date and time. Thus, a security administrator and employees of the security risk management system using company 300 are not able to see the vulnerability information before the release date and time, and therefore the secrecy of the vulnerability information is ensured.

(2) Second Embodiment

Figure 14:
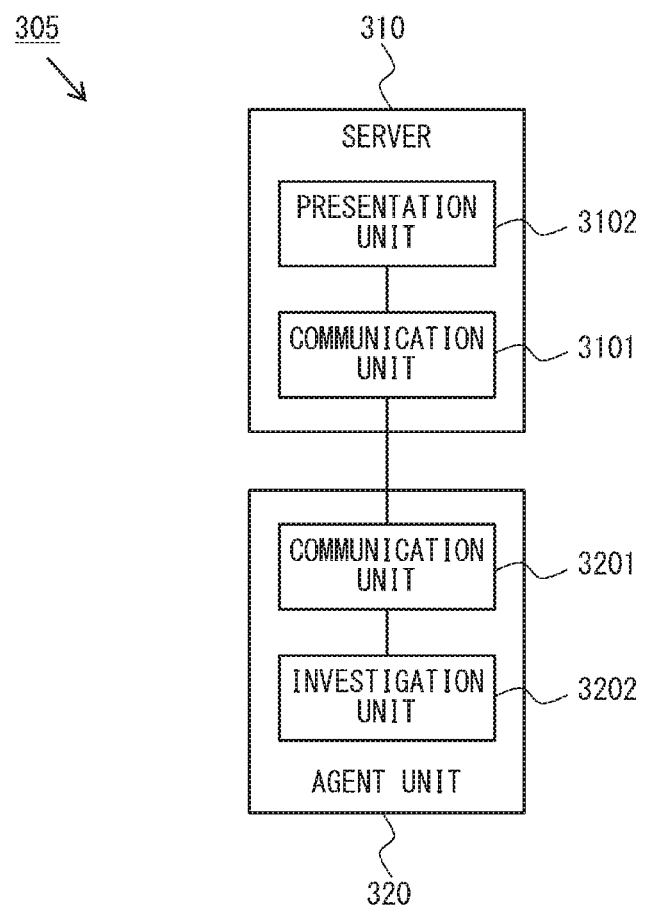
FIG. 14 is a block diagram showing a block configuration example of a security risk management system according to a second embodiment.

A second embodiment corresponds to one embodiment where the dominant conception of the above-described first embodiment is extracted. FIG. 14 shows a block configuration example of a security risk management system 305 according to the second embodiment.

Referring to FIG. 14, the security risk management system 305 according to the second embodiment includes a server 310 and an agent unit 320, just like in the first embodiment. The agent unit 320 corresponds to the terminal 330 whose vulnerabilities are to be managed (see FIG. 1), and it is installed into the corresponding terminal 330. Although FIG. 14 shows an example in which one agent unit 320 corresponding to one terminal 330 is placed, if there are a plurality of terminals 330, a plurality of agent units 320 respectively corresponding to the plurality of terminals 330 are placed.

The server 310 includes a communication unit 3101 and a presentation unit 3102. The communication unit 3101 corresponds to an element that combines the vulnerability information data distribution unit 313 and the vulnerability investigation result receiving unit 314 according to the first embodiment described above. The presentation unit 3102 corresponds to the vulnerability information and investigation result display unit 319 according to the first embodiment described above.

The agent unit 320 includes a communication unit 3201 and an investigation unit 3202. The communication unit 3201 corresponds to an element that combines the vulnerability information data receiving unit 321 and the vulnerability investigation result transmitting unit 327 according to the first embodiment described above. The investigation unit 3202 corresponds to the vulnerability investigation unit 323 according to the first embodiment described above.

The operation of the security risk management system 305 according to the second embodiment is described hereinafter with reference to FIG. 15.

Figure 15:
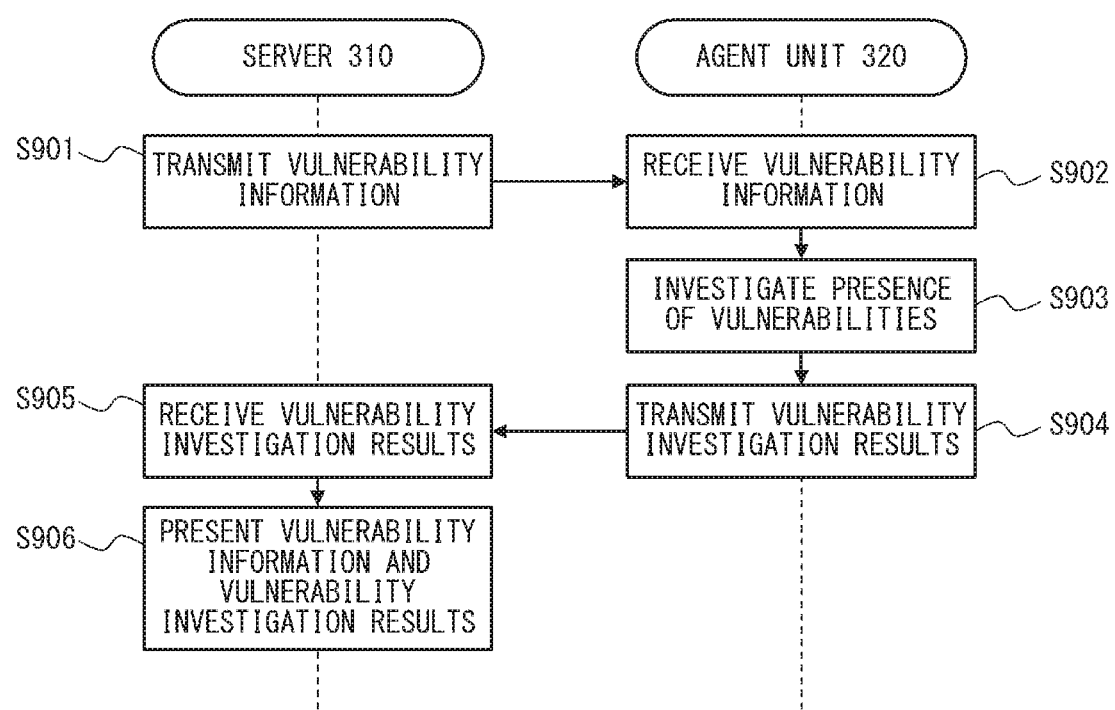
FIG. 15 is a sequence chart showing an operation example of the security risk management system according to the second embodiment.

Referring to FIG. 15, in the server 310, the communication unit 3101 transmits vulnerability information to the agent unit 320 before the release date and time of the vulnerability information (S901). In the case where there are a plurality of agent units 320, the server 310 transmits vulnerability information to each of the plurality of agent units 320.

In the agent unit 320, the communication unit 3201 receives vulnerability information transmitted from the server 310 before the release date and time of the vulnerability information (S902). The investigation unit 3202 investigates the presence or absence of vulnerabilities in the corresponding terminal 330 based on the method for investigation contained in the vulnerability information before the release date and time of the vulnerability information (S903). Further, the investigation unit 3202 transmits vulnerability investigation results containing investigation results regarding the presence or absence of vulnerabilities in the terminal 330 to the server 310 before the release date and time of the vulnerability information (S904). In the case where there are a plurality of agent units 320, each of the plurality of agent units 320 performs the operations of S902 to S904 described above.

In the server 310, the communication unit 3101 receives the vulnerability investigation results transmitted from the agent unit 320 before the release date and time of the vulnerability information (S905). The presentation unit 3102 presents the vulnerability information and the vulnerability investigation results (for example, displays them on a screen of the server 310) on or after the release date and time of the vulnerability information (S906).

As described above, according to the second embodiment, the server 310 transmits vulnerability information to the agent unit 320 so that the investigation regarding the presence or absence of vulnerabilities in the terminal 330 is completed before a release date and time, and then presents vulnerability investigation results on or after the release date and time.

Therefore, a security administrator can know investigation results regarding the presence or absence of vulnerabilities in the terminals 330 on the release date and time of the vulnerability information, and immediately take the next step of developing countermeasures against vulnerabilities. It is thereby possible to reduce the time needed to take countermeasures against vulnerabilities.

Note that, although the operations of the elements of the server 310 and the agent unit 320 according to the second embodiment are briefly described above, the elements of the server 310 and the agent unit 320 according to the second embodiment may perform the same operations as the corresponding elements in the first embodiment described above. Further, the server 310 and the agent unit 320 according to the second embodiment may further include another element included in the server 310 and the agent unit 320 according to the first embodiment described above.

While the present disclosure has been particularly shown and described with reference to embodiments thereof, the present disclosure is not limited to these embodiments. It will be understood by those of ordinary skill in the art that various changes in form and details may be made therein without departing from the spirit and scope of the present disclosure as defined by the claims.

For example, although the agent unit investigates the presence or absence of vulnerabilities in a terminal in the above-described embodiments, the server may investigate the presence or absence of vulnerabilities in a terminal. In this case, the agent unit may collect only information necessary for investigation from the terminal, and transmits the collected information to the server. The server investigates the presence or absence of vulnerabilities in each terminal based on the information collected from each agent unit.

Further, although vulnerability information data whose release flag indicates "released" is read, and then vulnerability investigation results are read based on the read vulnerability information data as shown in FIGS. 11 and 13 in the first embodiment described above, it is not limited thereto. For example, vulnerability investigation results indicating the presence of vulnerabilities may be read first, and then vulnerability information data may be read based on the read vulnerability investigation results.

Furthermore, although a plurality of steps (processing steps) are sequentially described in the plurality of flowcharts used in the description above, the order of performing the steps to be performed in the above-described embodiments is not limited to the sequence described above. In the above-described embodiments, the sequence of steps shown in the figures may be changed as appropriate.

Further, the whole or part of the embodiments disclosed above can be described as, but not limited to, the following supplementary notes.

(Supplementary Note 1)

A security risk management system comprising:
a server; and
an agent unit included in a terminal, wherein
the server transmits vulnerability information to the agent unit before a release date and time of the vulnerability information,
the agent unit investigates presence or absence of vulnerabilities in the terminal based on information regarding a method for vulnerability investigation contained in the vulnerability information, and transmits vulnerability investigation results containing the investigation results to the server before the release date and time of the vulnerability information, and
the server presents the vulnerability information and the vulnerability investigation results on or after the release date and time of the vulnerability information.

(Supplementary Note 2)

The security risk management system according to Supplementary Note 1, wherein
the server transmits the vulnerability information to the agent unit before a release date and time of the vulnerability information, the vulnerability information containing encrypted information regarding a method for vulnerability investigation, and
the agent unit decrypts the information regarding a method for vulnerability investigation contained in the vulnerability information, and investigates presence or absence of vulnerabilities in the terminal based on the decrypted information regarding a method for vulnerability investigation before the release date and time of the vulnerability information.

(Supplementary Note 3)

The security risk management system according to Supplementary Note 1 or 2, wherein
the server stores the vulnerability information before a release date and time of the vulnerability information, the vulnerability information containing encrypted information regarding an overview of vulnerabilities, a method for investigation and a method for countermeasures, and transmits the vulnerability information to the agent unit before the release date and time of the vulnerability information, the vulnerability information containing the encrypted information regarding an overview of vulnerabilities, a method for investigation and a method for countermeasures, and
the agent unit stores the vulnerability information before the release date and time of the vulnerability information, the vulnerability information containing the encrypted information regarding an overview of vulnerabilities, a method for investigation and a method for countermeasures.

(Supplementary Note 4)

The security risk management system according to Supplementary Note 3, wherein
a release flag to which a value indicating whether the vulnerability information is unreleased or released is set is added to the vulnerability information,
the server reads the vulnerability information to which the release flag to which a value indicating "unreleased" is set is added from among the stored vulnerability information, and
when a release date and time contained in the read vulnerability information is before a current date and time, the server decrypts the information regarding an overview of vulnerabilities, a method for investigation and a method for countermeasures contained in the read vulnerability information, sets a value indicating "released" to the release flag added to the read vulnerability information, and stores the read vulnerability information again.

(Supplementary Note 5)

The security risk management system according to Supplementary Note 4, wherein
a vulnerability information ID for identifying the vulnerability information is further added to the vulnerability information,
the vulnerability investigation results contain a vulnerability information ID for identifying the vulnerability information related to investigated vulnerabilities, a terminal ID for identifying the terminal, and investigation results indicating presence or absence of vulnerabilities in the terminal, the server stores the vulnerability investigation results, reads the vulnerability information to which the release flag to which a value indicating "released" is set is added from among the stored vulnerability information, reads the vulnerability investigation results containing the vulnerability information ID matching with the read vulnerability information and containing investigation results indicating presence of vulnerabilities in the terminal from among the stored vulnerability investigation results, and presents an overview and a method for countermeasures contained in the read vulnerability information and presents the terminal ID contained in the read vulnerability investigation results.

(Supplementary Note 6)

The security risk management system according to Supplementary Note 3, wherein a release flag to which a value indicating whether the vulnerability information is unreleased or released is set is added to the vulnerability information, the agent unit reads the vulnerability information to which the release flag to which a value indicating "unreleased" is set is added from among the stored vulnerability information, and when a release date and time contained in the read vulnerability information is before a current date and time, the agent unit decrypts the information regarding an overview of vulnerabilities, a method for investigation and a method for countermeasures contained in the read vulnerability information, sets a value indicating "released" to the release flag added to the read vulnerability information, and stores the read vulnerability information again.

(Supplementary Note 7)

The security risk management system according to Supplementary Note 6, wherein a vulnerability information ID for identifying the vulnerability information is further added to the vulnerability information, the vulnerability investigation results contain a vulnerability information ID for identifying the vulnerability information related to investigated vulnerabilities, a terminal ID for identifying the terminal, and investigation results indicating presence or absence of vulnerabilities in the terminal, the agent unit stores the vulnerability investigation results, reads the vulnerability information to which the release flag to which a value indicating "released" is set is added from among the stored vulnerability information, and when the vulnerability investigation results containing the vulnerability information ID matching with the read vulnerability information and containing investigation results indicating presence of vulnerabilities in the terminal are included in the stored vulnerability investigation results, presents an overview and a method for countermeasures contained in the read vulnerability information.

(Supplementary Note 8)

A server comprising:

a communication unit configured to transmit, to an agent unit included in a terminal, vulnerability information before a release date and time of the vulnerability information, and receives, from the agent unit, vulnerability investigation results containing investigation results regarding presence or absence of vulnerabilities in the terminal investigated by the agent unit based on information regarding a method for vulnerability investigation contained in the vulnerability information before the release date and time of the vulnerability information, and a presentation unit configured to present the vulnerability information and the vulnerability investigation results on or after the release date and time of the vulnerability information.

(Supplementary Note 9)

The server according to Supplementary Note 8, wherein the communication unit transmits the vulnerability information to the agent unit before a release date and time of the vulnerability information, the vulnerability information containing encrypted information regarding a method for vulnerability investigation.

(Supplementary Note 10)

The server according to Supplementary Note 8 or 9, further comprising:

a vulnerability information storage unit configured to store the vulnerability information before a release date and time of the vulnerability information, the vulnerability information containing encrypted information regarding an overview of vulnerabilities, a method for investigation and a method for countermeasures, wherein the communication unit transmits the vulnerability information to the agent unit before the release date and time of the vulnerability information, the vulnerability information containing the encrypted information regarding an overview of vulnerabilities, a method for investigation and a method for countermeasures.

(Supplementary Note 11)

The server according to Supplementary Note 10, further comprising:

a release date and time checking unit, wherein a release flag to which a value indicating whether the vulnerability information is unreleased or released is set is added to the vulnerability information, the release date and time checking unit reads the vulnerability information to which the release flag to which a value indicating "unreleased" is set is added from among the vulnerability information stored in the vulnerability information storage unit, and when a release date and time contained in the read vulnerability information is before a current date and time, the release date and time checking unit decrypts the information regarding an overview of vulnerabilities, a method for investigation and a method for countermeasures contained in the read vulnerability information, sets a value indicating "released" to the release flag added to the read vulnerability information, and stores the read vulnerability information again into the vulnerability information storage unit.

(Supplementary Note 12)

The server according to Supplementary Note 11, further comprising:

a vulnerability investigation result storage unit configured to store the vulnerability investigation results, wherein a vulnerability information ID for identifying the vulnerability information is further added to the vulnerability information, the vulnerability investigation results contain a vulnerability information ID for identifying the vulnerability information related to investigated vulnerabilities, a terminal ID for identifying the terminal, and investigation results indicating presence or absence of vulnerabilities in the terminal, the presentation unit reads the vulnerability information to which the release flag to which a value indicating "released" is set is added from among the vulnerability information stored in the vulnerability information storage unit, reads the vulnerability investigation results containing the vulnerability information ID matching with the read vulnerability information and containing investigation results indicating presence of vulnerabilities in the terminal from among the vulnerability investigation results stored in the vulnerability investigation result storage unit, and presents an overview and a method for countermeasures contained in the read vulnerability information and presents the terminal ID contained in the read vulnerability investigation results.

(Supplementary Note 13)

A control method of a server, comprising:

a transmission step of transmitting, to an agent unit included in a terminal, vulnerability information before a release date and time of the vulnerability information;

a step of receiving, from the agent unit, vulnerability investigation results containing investigation results regarding presence or absence of vulnerabilities in the terminal investigated by the agent unit based on information regarding a method for vulnerability investigation contained in the vulnerability information before the release date and time of the vulnerability information; and a presentation step of presenting the vulnerability information and the vulnerability investigation results on or after the release date and time of the vulnerability information.

(Supplementary Note 14)

The control method according to Supplementary Note 13, wherein the transmission step transmits the vulnerability information to the agent unit before a release date and time of the vulnerability information, the vulnerability information containing encrypted information regarding a method for vulnerability investigation.

(Supplementary Note 15)

The control method according to Supplementary Note 13 or 14, further comprising:

a step of storing, into a vulnerability information storage unit, the vulnerability information before a release date and time of the vulnerability information, the vulnerability information containing encrypted information regarding an overview of vulnerabilities, a method for investigation and a method for countermeasures, wherein the transmission step transmits the vulnerability information to the agent unit before the release date and time of the vulnerability information, the vulnerability information containing the encrypted information regarding an overview of vulnerabilities, a method for investigation and a method for countermeasures.

(Supplementary Note 16)

The control method according to Supplementary Note 15, wherein a release flag to which a value indicating whether the vulnerability information is unreleased or released is set is added to the vulnerability information, and the control method further comprises:

a step of reading the vulnerability information to which the release flag to which a value indicating "unreleased" is set is added from among the vulnerability information stored in the vulnerability information storage unit, and a step of, when a release date and time contained in the read vulnerability information is before a current date and time, decrypting the information regarding an overview of vulnerabilities, a method for investigation and a method for countermeasures contained in the read vulnerability information, setting a value indicating "released" to the release flag added to the read vulnerability information, and storing the read vulnerability information again into the vulnerability information storage unit.

(Supplementary Note 17)

The control method according to Supplementary Note 16, wherein a vulnerability information ID for identifying the vulnerability information is further added to the vulnerability information, the vulnerability investigation results contain a vulnerability information ID for identifying the vulnerability information related to investigated vulnerabilities, a terminal ID for identifying the terminal, and investigation results indicating presence or absence of vulnerabilities in the terminal, the control method further comprises:

a step of storing the vulnerability investigation results into a vulnerability investigation result storage unit, a step of reading the vulnerability information to which the release flag to which a value indicating "released" is set is added from among the vulnerability information stored in the vulnerability information storage unit, a step of reading the vulnerability investigation results containing the vulnerability information ID matching with the read vulnerability information and containing investigation results indicating presence of vulnerabilities in the terminal from among the vulnerability investigation results stored in the vulnerability investigation result storage unit, and the presentation step presents an overview and a method for countermeasures contained in the read vulnerability information, and presents the terminal ID contained in the read vulnerability investigation results.

(Supplementary Note 18)

A non-transitory computer readable medium storing a program causing a computer to execute:

a transmission step of transmitting, to an agent unit included in a terminal, vulnerability information before a release date and time of the vulnerability information;

a step of receiving, from the agent unit, vulnerability investigation results containing investigation results regarding presence or absence of vulnerabilities in the terminal investigated by the agent unit based on information regarding a method for vulnerability investigation contained in the vulnerability information before a release date and time of the vulnerability information; and a presentation step of presenting the vulnerability information and the vulnerability investigation results on or after the release date and time of the vulnerability information.

(Supplementary Note 19)

The non-transitory computer readable medium according to Supplementary Note 18, wherein the transmission step transmits the vulnerability information to the agent unit before a release date and time of the vulnerability information, the vulnerability information containing encrypted information regarding a method for vulnerability investigation.

(Supplementary Note 20)

The non-transitory computer readable medium according to Supplementary Note 18 or 19, wherein the program causes the computer to further execute:

a step of storing, into a vulnerability information storage unit, the vulnerability information before a release date and time of the vulnerability information, the vulnerability information containing encrypted information regarding an overview of vulnerabilities, a method for investigation and a method for countermeasures, wherein the transmission step transmits the vulnerability information to the agent unit before the release date and time of the vulnerability information, the vulnerability information containing the encrypted information regarding an overview of vulnerabilities, a method for investigation and a method for countermeasures.

(Supplementary Note 21)

The non-transitory computer readable medium according to Supplementary Note 20, wherein a release flag to which a value indicating whether the vulnerability information is unreleased or released is set is added to the vulnerability information, and the program causes the computer to further execute:

a step of reading the vulnerability information to which the release flag to which a value indicating "unreleased" is set is added from among the vulnerability information stored in the vulnerability information storage unit, and a step of, when a release date and time contained in the read vulnerability information is before a current date and time, decrypting the information regarding an overview of vulnerabilities, a method for investigation and a method for countermeasures contained in the read vulnerability information, setting a value indicating "released" to the release flag added to the read vulnerability information, and storing the read vulnerability information again into the vulnerability information storage unit.

(Supplementary Note 22)

The non-transitory computer readable medium according to Supplementary Note 21, wherein a vulnerability information ID for identifying the vulnerability information is further added to the vulnerability information, the vulnerability investigation results contain a vulnerability information ID for identifying the vulnerability information related to investigated vulnerabilities, a terminal ID for identifying the terminal, and investigation results indicating presence or absence of vulnerabilities in the terminal, the program causes the computer to further execute:

a step of storing the vulnerability investigation results into a vulnerability investigation result storage unit, a step of reading the vulnerability information to which the release flag to which a value indicating "released" is set is added from among the vulnerability information stored in the vulnerability information storage unit, a step of reading the vulnerability investigation results containing the vulnerability information ID matching with the read vulnerability information and containing investigation results indicating presence of vulnerabilities in the terminal from among the vulnerability investigation results stored in the vulnerability investigation result storage unit, and the presentation step presents an overview and a method for countermeasures contained in the read vulnerability information, and presents the terminal ID contained in the read vulnerability investigation results.

(Supplementary Note 23)

A non-transitory computer readable medium storing a program causing a computer to execute:

a receiving step of receiving, from a server, vulnerability information before a release date and time of the vulnerability information;

an investigation step of investing presence or absence of vulnerabilities in a terminal based on information regarding a method for vulnerability investigation contained in the vulnerability information before a release date and time of the vulnerability information; and a step of transmitting, to the server, vulnerability investigation results containing investigation results in the investigation step before the release date and time of the vulnerability information.

(Supplementary Note 24)

The non-transitory computer readable medium according to Supplementary Note 23, wherein the receiving step receives, from the server, the vulnerability information before a release date and time of the vulnerability information, the vulnerability information containing encrypted information regarding a method for vulnerability investigation, and the investigation step decrypts the information regarding a method for vulnerability investigation contained in the vulnerability information, and investigates presence or absence of vulnerabilities in the terminal based on the decrypted information regarding a method for vulnerability investigation before the release date and time of the vulnerability information.

(Supplementary Note 25)

The non-transitory computer readable medium according to Supplementary Note 23 or 24, wherein the receiving step receives, from the server, the vulnerability information before a release date and time of the vulnerability information, the vulnerability information containing encrypted information regarding an overview of vulnerabilities, a method for investigation and a method for countermeasures, and the program causes the computer to further execute:

a step of storing the vulnerability information into a vulnerability information storage unit before the release date and time of the vulnerability information, the vulnerability information containing the encrypted information regarding an overview of vulnerabilities, a method for investigation and a method for countermeasures.

(Supplementary Note 26)

The non-transitory computer readable medium according to Supplementary Note 25, wherein a release flag to which a value indicating whether the vulnerability information is unreleased or released is set is added to the vulnerability information, the program causes the computer to further execute:

a step of reading the vulnerability information to which the release flag to which a value indicating "unreleased" is set is added from among the vulnerability information stored in the vulnerability information storage unit, and a step of, when a release date and time contained in the read vulnerability information is before a current date and time, decrypting the information regarding an overview of vulnerabilities, a method for investigation and a method for countermeasures contained in the read vulnerability information, setting a value indicating "released" to the release flag added to the read vulnerability information, and storing the read vulnerability information again into the vulnerability information storage unit.

(Supplementary Note 27)

The non-transitory computer readable medium according to Supplementary Note 26, wherein a vulnerability information ID for identifying the vulnerability information is further added to the vulnerability information, the vulnerability investigation results contain a vulnerability information ID for identifying the vulnerability information related to investigated vulnerabilities, a terminal ID for identifying the terminal, and investigation results indicating presence or absence of vulnerabilities in the terminal, the program causes the computer to further execute:

a step of storing the vulnerability investigation results into a vulnerability investigation result storage unit, a step of reading the vulnerability information to which the release flag to which a value indicating "released" is set is added from among the vulnerability information stored in the vulnerability information storage unit, and a step of, when the vulnerability investigation results containing the vulnerability information ID matching with the read vulnerability information and containing investigation results indicating presence of vulnerabilities in the terminal are included in the vulnerability investigation results stored in the vulnerability investigation result storage unit, presenting an overview and a method for countermeasures contained in the read vulnerability information.

REFERENCE SIGNS LIST

100 VULNERABILITY INFORMATION PROVIDING INSTITUTION
110 VULNERABILITY INFORMATION TRANSMISSION SYSTEM
200 SECURITY RISK MANAGEMENT SYSTEM PROVIDING COMPANY
210 VULNERABILITY INFORMATION DISTRIBUTION SYSTEM
211 VULNERABILITY INFORMATION RECEIVING UNIT
212 VULNERABILITY INFORMATION DATA CREATION UNIT
213 VULNERABILITY INFORMATION DATA ENCRYPTION UNIT
214 COMMON KEY STORAGE UNIT
215 VULNERABILITY INFORMATION DATA STORAGE UNIT
216 VULNERABILITY INFORMATION DATA TRANSMITTING UNIT
300 SECURITY RISK MANAGEMENT SYSTEM USING COMPANY
305 SECURITY RISK MANAGEMENT SYSTEM
310 SERVER
311 VULNERABILITY INFORMATION DATA RECEIVING UNIT
312 VULNERABILITY INFORMATION DATA STORAGE UNIT
313 VULNERABILITY INFORMATION DATA DISTRIBUTION UNIT
314 VULNERABILITY INVESTIGATION RESULT RECEIVING UNIT
315 VULNERABILITY INVESTIGATION RESULT STORAGE UNIT
316 VULNERABILITY RELEASE DATE AND TIME CHECKING UNIT 316
317 VULNERABILITY INFORMATION DATA DECRYPTION UNIT
318 COMMON KEY STORAGE UNIT
319 VULNERABILITY INFORMATION AND INVESTIGATION RESULT DISPLAY UNIT
3101 COMMUNICATION UNIT
3102 PRESENTATION UNIT
320 AGENT UNIT
321 VULNERABILITY INFORMATION DATA RECEIVING UNIT
322 VULNERABILITY INFORMATION DATA STORAGE UNIT
323 VULNERABILITY INVESTIGATION UNIT
324 VULNERABILITY INFORMATION DATA DECRYPTION UNIT
325 COMMON KEY STORAGE UNIT
326 VULNERABILITY INVESTIGATION RESULT STORAGE UNIT
327 VULNERABILITY INVESTIGATION RESULT TRANSMITTING UNIT
328 VULNERABILITY RELEASE DATE AND TIME CHECKING UNIT
329 VULNERABILITY INFORMATION DISPLAY UNIT
3201 COMMUNICATION UNIT
3202 INVESTIGATION UNIT
330 TERMINAL
400 COMPUTER
401 PROCESSOR
402 MEMORY
403 STORAGE
404 INPUT/OUTPUT INTERFACE
4041 DISPLAY DEVICE
4042 INPUT DEVICE
405 COMMUNICATION INTERFACE

The invention claimed is:

1. A security risk management system comprising:

a server device; and an agent unit included in a terminal device, wherein the agent unit is executed by central processing unit and is associated with a software vendor; wherein:

the server device transmits vulnerability information to the agent unit over a communication network before a release date and time of the vulnerability information, the agent unit investigates presence or absence of vulnerabilities in the terminal device based on information regarding a method for vulnerability investigation contained in the vulnerability information, and transmits vulnerability investigation results containing the investigation results to the server device before the release date and time of the vulnerability information, the server device presents the vulnerability information and the vulnerability investigation results on or after the release date and time of the vulnerability information, the server device stores the vulnerability information before a release date and time of the vulnerability information, the vulnerability information containing encrypted information regarding an overview of vulnerabilities, a method for investigation and a method for countermeasures, and transmits the vulnerability information to the agent unit before the release date and time of the vulnerability information, the vulnerability information containing the encrypted information regarding an overview of vulnerabilities, a method for investigation and a method for countermeasures, the agent unit stores the vulnerability information before the release date and time of the vulnerability information, the vulnerability information containing the encrypted information regarding an overview of vulnerabilities, a method for investigation and a method for countermeasures, a release flag to which a value indicating whether the vulnerability information is unreleased or released is set is added to the vulnerability information, the server device reads the vulnerability information to which the release flag to which a value indicating "unreleased" is set is added from among the stored vulnerability information, and when a release date and time contained in the read vulnerability information is before a current date and time, the server device decrypts the information regarding an overview of vulnerabilities, a method for investigation and a method for countermeasures contained in the read vulnerability information, sets a value indicating "released" to the release flag added to the read vulnerability information, and stores the read vulnerability information again.

2. The security risk management system according to claim 1, wherein
the server device transmits the vulnerability information to the agent unit before a release date and time of the vulnerability information, the vulnerability information containing encrypted information regarding a method for vulnerability investigation, and
the agent unit decrypts the information regarding a method for vulnerability investigation contained in the vulnerability information, and investigates presence or absence of vulnerabilities in the terminal device based on the decrypted information regarding a method for vulnerability investigation before the release date and time of the vulnerability information.

3. The security risk management system according to claim 1, wherein
a vulnerability information ID for identifying the vulnerability information is further added to the vulnerability information,
the vulnerability investigation results contain a vulnerability information ID for identifying the vulnerability information related to investigated vulnerabilities, a terminal ID for identifying the terminal device, and investigation results indicating presence or absence of vulnerabilities in the terminal device,
the server device stores the vulnerability investigation results, reads the vulnerability information to which the release flag to which a value indicating "released" is set is added from among the stored vulnerability information, reads the vulnerability investigation results containing the vulnerability information ID matching with the read vulnerability information and containing investigation results indicating presence of vulnerabilities in the terminal device from among the stored vulnerability investigation results, and presents an overview and a method for countermeasures contained in the read vulnerability information and presents the terminal ID contained in the read vulnerability investigation results.

4. The security risk management system according to claim 1, wherein
a release flag to which a value indicating whether the vulnerability information is unreleased or released is set is added to the vulnerability information,
the agent unit reads the vulnerability information to which the release flag to which a value indicating "unreleased" is set is added from among the stored vulnerability information, and
when a release date and time contained in the read vulnerability information is before a current date and time, the agent unit decrypts the information regarding an overview of vulnerabilities, a method for investigation and a method for countermeasures contained in the read vulnerability information, sets a value indicating "released" to the release flag added to the read vulnerability information, and stores the read vulnerability information again.

5. The security risk management system according to claim 4, wherein
a vulnerability information ID for identifying the vulnerability information is further added to the vulnerability information,
the vulnerability investigation results contain a vulnerability information ID for identifying the vulnerability information related to investigated vulnerabilities, a terminal ID for identifying the terminal device, and investigation results indicating presence or absence of vulnerabilities in the terminal device,
the agent unit stores the vulnerability investigation results, reads the vulnerability information to which the release flag to which a value indicating "released" is set is added from among the stored vulnerability information, and when the vulnerability investigation results containing the vulnerability information ID matching with the read vulnerability information and containing investigation results indicating presence of vulnerabilities in the terminal device are included in the stored vulnerability investigation results, presents an overview and a method for countermeasures contained in the read vulnerability information.

6. A server device comprising:
a communication unit, executed by a central processing unit, configured to transmit, to an agent unit, executed by a central processing unit that is associated with a software vendor, included in a terminal device, vulnerability information before a release date and time of the vulnerability information, and receives, from the agent unit, vulnerability investigation results containing investigation results regarding presence or absence of vulnerabilities in the terminal device investigated by the agent unit based on information regarding a method for vulnerability investigation contained in the vulnerability information before the release date and time of the vulnerability information,
a presentation unit, executed by a central processing unit, configured to present the vulnerability information and the vulnerability investigation results on or after the release date and time of the vulnerability information, and
a vulnerability information storage unit configured to store the vulnerability information before a release date and time of the vulnerability information, the vulnerability information containing encrypted information regarding an overview of vulnerabilities, a method for investigation and a method for countermeasures, wherein:
the communication unit transmits the vulnerability information to the agent unit before the release date and time of the vulnerability information, the vulnerability information containing the encrypted information regarding an overview of vulnerabilities, a method for investigation and a method for countermeasures,
further comprising a release date and time checking unit, executed by a central processing unit, wherein:
a release flag to which a value indicating whether the vulnerability information is unreleased or released is set is added to the vulnerability information,
the release date and time checking unit reads the vulnerability information to which the release flag to which a value indicating "unreleased" is set is added from among the vulnerability information stored in the vulnerability information storage unit, and
when a release date and time contained in the read vulnerability information is before a current date and time, the release date and time checking unit decrypts the information regarding an overview of vulnerabilities, a method for investigation and a method for countermeasures contained in the read vulnerability information, sets a value indicating "released" to the release flag added to the read vulnerability information, and stores the read vulnerability information again into the vulnerability information storage unit.

7. The server device according to claim 6, wherein the communication unit transmits the vulnerability information to the agent unit before a release date and time of the vulnerability information, the vulnerability information containing encrypted information regarding a method for vulnerability investigation.

8. The server device according to claim 6, further comprising:
a vulnerability investigation result storage unit configured to store the vulnerability investigation results, wherein
a vulnerability information ID for identifying the vulnerability information is further added to the vulnerability information,
the vulnerability investigation results contain a vulnerability information ID for identifying the vulnerability information related to investigated vulnerabilities, a terminal ID for identifying the terminal device, and investigation results indicating presence or absence of vulnerabilities in the terminal device,
the presentation unit reads the vulnerability information to which the release flag to which a value indicating "released" is set is added from among the vulnerability information stored in the vulnerability information storage unit, reads the vulnerability investigation results containing the vulnerability information ID matching with the read vulnerability information and containing investigation results indicating presence of vulnerabilities in the terminal device from among the vulnerability investigation results stored in the vulnerability investigation result storage unit, and presents an overview and a method for countermeasures contained in the read vulnerability information and presents the terminal ID contained in the read vulnerability investigation results.

9. A control method of a server device, comprising:
transmitting, to an agent unit, executed by a central processing unit that is associated with a software vendor, included in a terminal device, vulnerability information before a release date and time of the vulnerability information;
receiving, from the agent unit, vulnerability investigation results containing investigation results regarding presence or absence of vulnerabilities in the terminal device investigated by the agent unit based on information regarding a method for vulnerability investigation contained in the vulnerability information before the release date and time of the vulnerability information;
presenting the vulnerability information and the vulnerability investigation results on or after the release date and time of the vulnerability information,
storing the vulnerability information before a release date and time of the vulnerability information, the vulnerability information containing encrypted information regarding an overview of vulnerabilities, a method for investigation and a method for countermeasures,
transmitting the vulnerability information to the agent unit before the release date and time of the vulnerability information, the vulnerability information containing the encrypted information regarding an overview of vulnerabilities, a method for investigation and a method for countermeasures,
a release flag to which a value indicating whether the vulnerability information is unreleased or released is set is added to the vulnerability information,
reading the vulnerability information to which the release flag to which a value indicating "unreleased" is set is added from among the stored vulnerability information, and
when a release date and time contained in the read vulnerability information is before a current date and time, decrypting the information regarding an overview of vulnerabilities, a method for investigation and a method for countermeasures contained in the read vulnerability information, sets a value indicating "released" to the release flag added to the read vulnerability information, and storing the read vulnerability information again.

\* \* \* \* \*